(12) United States Patent
Arai

(10) Patent No.: US 7,075,664 B2
(45) Date of Patent: Jul. 11, 2006

(54) IMAGE FORMING APPARATUS AND CONTROL METHOD THEREFOR

(75) Inventor: Koji Arai, Saitama (JP)

(73) Assignee: Canon Kabushiki Kaisha, Tokyo (JP)

( * ) Notice: Subject to any disclaimer, the term of this patent is extended or adjusted under 35 U.S.C. 154(b) by 813 days.

(21) Appl. No.: 09/796,547

(22) Filed: Mar. 2, 2001

(65) Prior Publication Data

US 2001/0022659 A1 Sep. 20, 2001

(30) Foreign Application Priority Data

Mar. 3, 2000 (JP) .............................. 2000-059330

(51) Int. Cl.
*G06F 3/12* (2006.01)
*G06F 13/00* (2006.01)

(52) U.S. Cl. ...................... 358/1.1; 358/1.9; 358/1.13

(58) Field of Classification Search ........ 358/1.1–1.18, 358/3.06, 3.02, 3.1, 3.23, 504, 515, 530
See application file for complete search history.

(56) References Cited

U.S. PATENT DOCUMENTS 5,508,826 A * 4/1996 Lloyd et al. ................ 358/501
5,940,530 A * 8/1999 Fukushima et al. ......... 382/164
6,094,280 A * 7/2000 Hayasaki et al. ............ 358/1.9
6,184,915 B1 2/2001 Atsumi et al. .............. 347/251
6,697,167 B1 2/2004 Takahashi ................... 358/1.9

FOREIGN PATENT DOCUMENTS

JP 09-116768 5/1997
JP 10-028229 1/1998

* cited by examiner

*Primary Examiner*—Douglas Q. Tran
(74) *Attorney, Agent, or Firm*—Fitzpatrick, Cella, Harper & Scinto

(57) ABSTRACT

This invention discloses an image forming apparatus having an image reading function that can correct the density even when an image is formed based on data acquired from an apparatus other than an image reading apparatus, and a control method therefor. A printer controller (2103) includes a PG unit (3112) for generating a pattern having a predetermined density. The pattern is transmitted to an engine controller (2002) via an output I/F to obtain a print result. Correction data representing the difference between a result obtained by reading the print result and a predetermined characteristic is received from a reader controller via a serial communication controller (3111). The correction data is stored in a data correction unit (3108) and used for printing data subsequently received via an input I/F.

9 Claims, 27 Drawing Sheets

PRINT REQUEST DURING COPYING OPERATION

1301

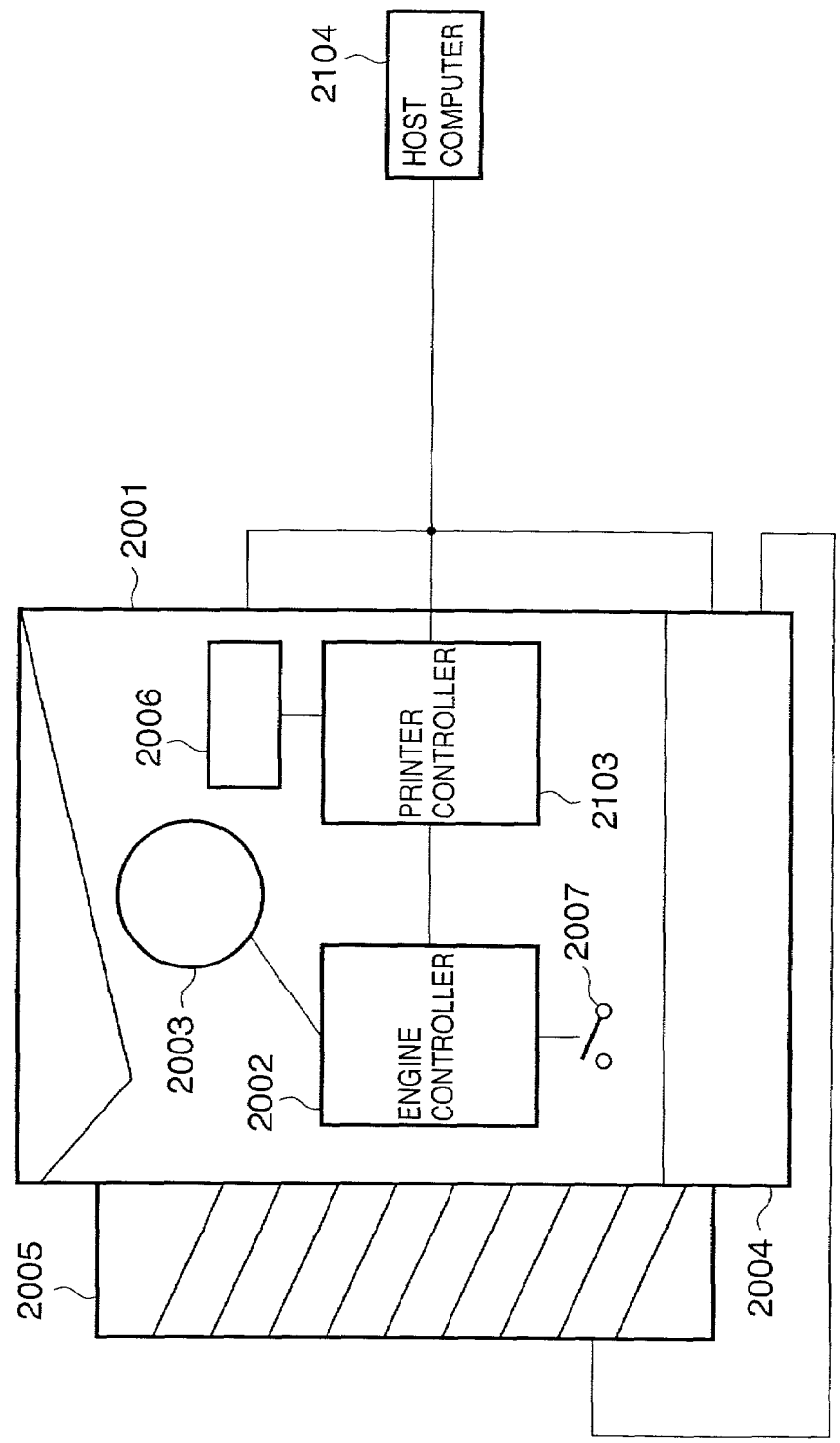

FIG. 4

| SIGNAL NAME | ABBRE-VIATION | SIGNAL DIRECTION |
|---|---|---|
| PRINTER POWER READY | /PPRDY | PRINTER CONTROLLER ← ENGINE CONTROLLER |
| CONTROLLER POWER READY | /CPRDY | PRINTER CONTROLLER → ENGINE CONTROLLER |
| READY | /RDY | PRINTER CONTROLLER ← ENGINE CONTROLLER |
| PRINT | /PRNT | PRINTER CONTROLLER → ENGINE CONTROLLER |
| TOP OF PAGE | /TOP | PRINTER CONTROLLER ← ENGINE CONTROLLER |
| LINE SYNCHRONIZATION | /LSYNC | PRINTER CONTROLLER ← ENGINE CONTROLLER |
| VIDEO CLOCK | /VCLK | PRINTER CONTROLLER → ENGINE CONTROLLER |
| VIDEO ENABLE | /VDOEN | PRINTER CONTROLLER → ENGINE CONTROLLER |
| VIDEO | /VDO | PRINTER CONTROLLER → ENGINE CONTROLLER |
| CONTROLLER CLOCK | /CCLK | PRINTER CONTROLLER → ENGINE CONTROLLER |
| COMMAND BUSY | /CBSY | PRINTER CONTROLLER → ENGINE CONTROLLER |
| COMMAND | /CMD | PRINTER CONTROLLER → ENGINE CONTROLLER |
| STATUS BUSY | /SBSY | PRINTER CONTROLLER ← ENGINE CONTROLLER |
| STATUS | /STS | PRINTER CONTROLLER ← ENGINE CONTROLLER |
| PRINTER POWER READY | /PFED | PRINTER CONTROLLER ← ENGINE CONTROLLER |
| SPEED CHANGE | /SPCHG | PRINTER CONTROLLER ← ENGINE CONTROLLER |
| PAPER DELIVERY | /PDLV | PRINTER CONTROLLER ← ENGINE CONTROLLER |
| LEADING END OF PAPER | /TOPR | PRINTER CONTROLLER ← ENGINE CONTROLLER |
| STATUS CHANGE NOTIFICATION | /CCRT | PRINTER CONTROLLER ← ENGINE CONTROLLER | ved image data is output by the
IMAGE FORMING APPARATUS AND CONTROL METHOD THEREFOR

FIELD OF THE INVENTION

The present invention relates to an image forming apparatus such as a copying machine having an image reading function and a control method therefor.

BACKGROUND OF THE INVENTION

Copying machines, and image forming systems using image reading and forming apparatuses have conventionally been used. Such a machine or system is designed to obtain an exact copy of an original. For this purpose, it is important to adjust the density when read image data is output by the image forming apparatus.

For example, a known copying machine corrects the image density by printing a specific pattern on a printing sheet by a printer, reading the pattern by an image reader, comparing the actually read value with a reference value, and correcting the density.

Density correction is, however, effective only when an image is formed on the basis of image data obtained by using the image reading apparatus, i.e., when the copying machine is used. This density correction is not suitable when an image is formed by using image data acquired without using the image reading apparatus or printing data such as PDL (Page Description Language), e.g., when a network-connectable copying machine is used as a printer from a computer on a network.

SUMMARY OF THE INVENTION

The present invention has been made to overcome the conventional drawbacks, and has as its object to provide an image forming apparatus having an image reading function that can appropriately correct the density even when an image is formed based on data acquired from an apparatus other than an image reading apparatus, and a control method therefor.

According to a gist of the present invention, there is provided an image forming apparatus comprising image forming means for forming an image on the basis of print data and outputting the image, first print data generation means for generating the print data from original image data read by image reading means, and second print data generation means which generates the print data on the basis of printing data received from a device other than the image reading means, and can communicate with the first print data generation means, characterized in that the first print data generation means includes communication means capable of transmitting, to the second print data generation means, either of the original image data read by the image reading means, and correction data based on the original image data read by the image reading means and predetermined data, and the second print data generation means includes test data generation means for generating test print data, and correction means for performing predetermined correction for subsequently received printing data or the print data generated based on the printing data, on the basis of the original image data and predetermined data from the communication means or on the basis of the correction data.

According to another gist of the present invention, there is provided a method of controlling an image forming apparatus having image forming means for forming an image on the basis of print data and outputting the image, first print data generation means for generating the print data from original image data read by image reading means, and second print data generation means which generates the print data on the basis of printing data received from a device other than the image reading means, and can communicate with the first print data generation means, characterized by comprising the communication step of generating original image data read by the image reading means, or correction data based on the original image data read by the image reading means and predetermined data, and transmitting the original image data or correction data to the second print data generation means, and the correction step of causing the second print data generation means to perform predetermined correction for subsequently received printing data or the print data generated based on printing data, on the basis of the original image data and predetermined data or the correction data transmitted in the communication step.

According to still another gist of the present invention, there is provided a storage medium which stores a control program for an image forming apparatus having image forming means for forming an image on the basis of print data and outputting the image, first print data generation means for generating the print data from original image data read by image reading means, and second print data generation means which generates the print data on the basis of printing data received from a device other than the image reading means, and can communicate with the first print data generation means, characterized by comprising a program code of the communication step of generating original image data read by the image reading means, or correction data based on the original image data read by the image reading means and predetermined data, and transmitting the original image data or correction data to the second print data generation means, and a program code of the correction step of causing the second print data generation means to perform predetermined correction for subsequently received printing data or the print data generated based on printing data, on the basis of the original image data and predetermined data or the correction data transmitted in the communication step.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 2 is a block diagram showing an arrangement of an image processing apparatus having a module structure;

FIG. 4 is a table showing a list of video I/F signals;

DETAILED DESCRIPTION OF THE PREFERRED EMBODIMENTS

Preferred embodiments of the present invention will now be described in detail in accordance with the accompanying drawings.

[Overall Arrangement]

Figure 1A:
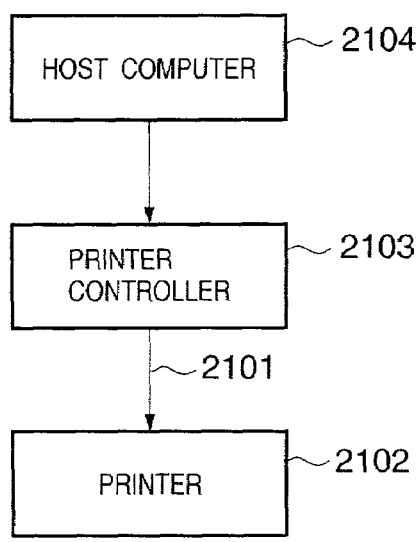
FIGS. 1A and 1B are block diagrams showing the positioning of a printer as a basic function of an image processing apparatus in an overall arrangement.
Figure 1B:
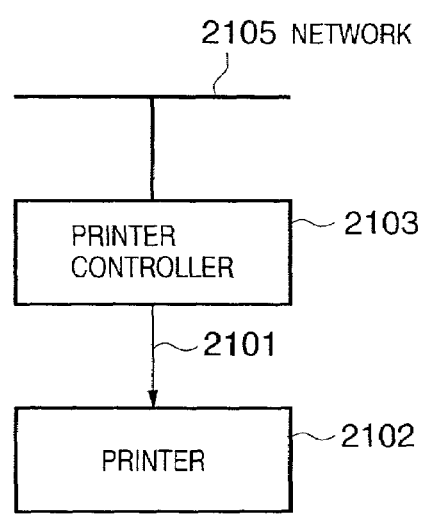

The overall arrangement will be described. FIGS. 1A and 1B are block diagrams showing the positioning of a printer as a basic function of an image processing apparatus in the overall arrangement. Reference numeral 2101 denotes a video I/F which communicates with a printer 2102 and printer controller 2103 (to be described later). Details of I/F signals will be explained. The printer 2102 forms an electrical image signal received via the I/F 2101 into a visible image by using toner or the like, transfers the image onto a printing sheet, and fixes and outputs the image. To implement the image formation sequence, the printer 2102 controls various loads. Further, the printer 2102 detects the printer status and notifies the printer controller of the status.

The printer controller 2103 receives data sent via a host computer 2104 (FIG. 1A) or a network 2105 (FIG. 1B). Data are sent in various formats as bitmap data and PDL (Page Description Language) data. The printer controller 2103 rasterizes data in a memory and transfers the data as raster data to the printer 2102. In this manner, data created by the host computer can be output from the printer. The printer controller and printer are separately illustrated in FIGS. 1A and 1B for convenience, but the printer controller may be inside the printer, which is popular in an actual arrangement.

FIG. 2 is a block diagram showing an arrangement of an image processing apparatus having a module structure. In FIG. 2, reference numeral 2001 denotes a printer main body as a basic structure; 2002, an engine controller for controlling sheet convey and image formation of the printer; 2003, an image forming unit; 2103, the printer controller in FIGS. 1A and 1B which is incorporated in the printer main body 2001, as shown in FIG. 2; 2104, the host computer in FIG. 1A which is connected to the printer controller 2103 in one-to-one correspondence or via the network 2105; 2004, a sheet cassette deck which can be added as an option; 2005, a sorter which can be added as an option; and 2006, an option controller for controlling the optional cassette deck and optional sorter. In the following description, the whole mechanism concerning print operation in the printer main body, particularly the whole mechanism controlled by the engine controller will be explained as a "printer" as descriptive convenience.

[Arrangements of Printer Controller and Printer]

The present invention relates to an image processing apparatus with a composite function obtained when a module is mounted in the basic structure to add a function. The arrangements of the printer controller and printer will be explained as the premise of the image processing apparatus.

Figure 3:
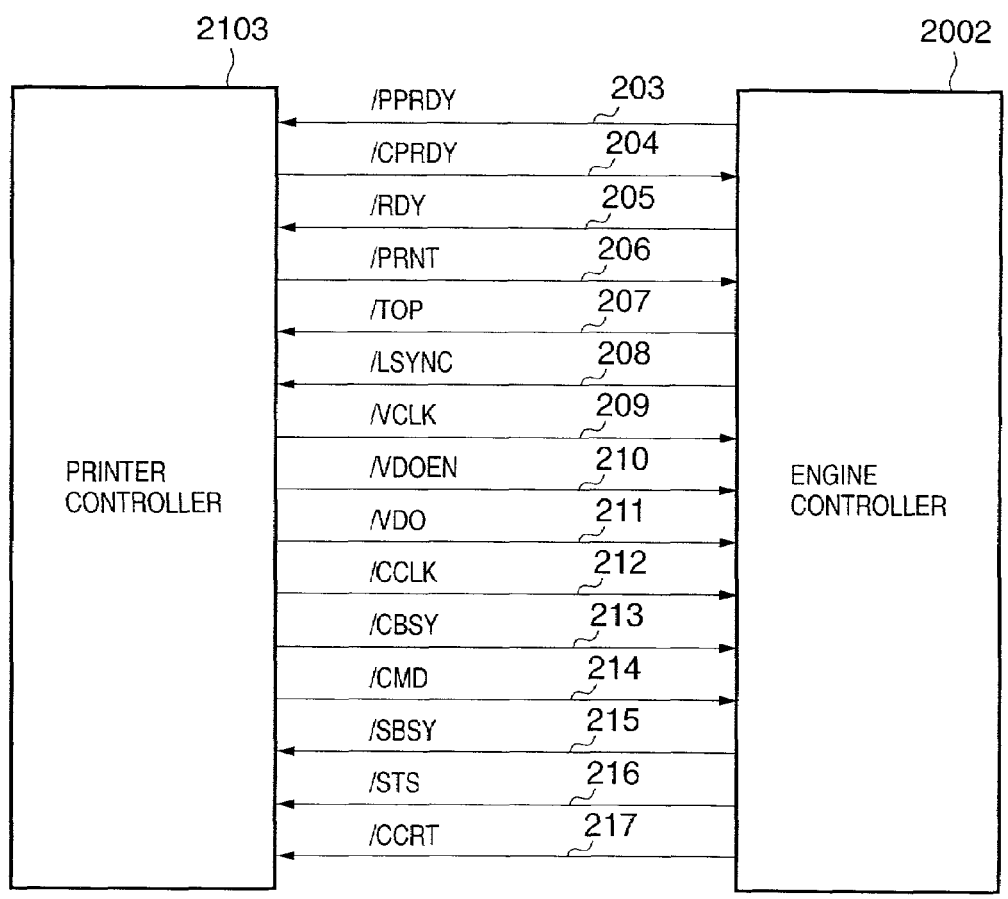
FIG. 3 is a block diagram for explaining representative signals exchanged between an engine controller and a printer controller in FIG. 2.

The video I/F 2101 connecting the printer controller and printer will be described in detail. FIG. 3 is a block diagram for explaining representative signals exchanged between the engine controller 2002 and the printer controller 2103 in FIG. 2.

FIG. 4 shows a list of video I/F signals, among which the representative signals shown in FIG. 3 will be explained.

A /PPRDY signal 203 represents that the printer is turned on, processing such as initial setting ends, and communication with the printer controller is enabled.

A /CPRDY signal 204 represents that the printer controller is turned on, processing such as initial setting ends, and communication with the engine controller is enabled.

A /RDY signal 205 represents that the engine controller receives a print start instruction (/PRNT signal to be described below) from the printer controller and enables print operation. This signal becomes true when each portion of the printer normally operates, e.g., the internal temperature of a fixing unit reaches a predetermined temperature, no printing sheet remains in the printer, or a polygon mirror rotates at a predetermined speed.

A /PRNT signal 206 is used by the printer controller to instruct the engine controller to start or continue print operation.

A /TOP signal 207 is a sync signal serving as the reference of vertical image scanning that is transferred from the engine controller to the printer controller. This signal is output a predetermined time after the signal 206 is output from the printer controller.

A /LSYNC signal 208 is a sync signal used as the reference of horizontal scanning by the printer controller. Similar to the /TOP signal, the /LSYNC signal 208 is output a predetermined time after the signal 206 is output from the printer controller.

A /VCLK signal 209 is a sync clock for /VDOEN and /VDO signals (to be described below), and causes the printer controller to output a clock having a frequency corresponding to an image signal.

A /VDOEN signal 210 is for controlling input of an image signal from the printer controller to the engine controller. The engine controller detects whether the signal 210 is true/false in synchronism with the /VCLK signal, receives the signal 210 if it is true, and does not receive the signal 210 if it is false.

A /VDO signal 211 is image data. The printer controller outputs the /VDO signal 211 in synchronism with the /VCLK signal by using as a reference the /TOP signal for the vertical direction or the /LSYNC signal for the horizontal direction.

A /CCLK signal 212 is a sync clock when the printer controller transmits a serial command to the engine controller and the engine controller sends back a serial status to the printer controller. The /CCLK signal 212 is output from the printer controller.

A /CBSY signal 213 represents to the engine controller that the printer controller transmits a serial command by using a /CMD signal (to be described below).

A /CMD signal 214 is used by the printer controller in transmitting serial information to the engine controller. Serial information will be referred to as a command.

A /SBSY signal 215 represents to the printer controller that the engine controller sends back a serial status by using a /STS signal.

A /STS signal 216 is used by the engine controller in sending back serial information to the printer controller. Serial information will be referred to as a status.

A /CCRT signal 217 notifies the printer controller that the internal status of the printer changed. Upon reception of this notification signal, the printer controller uses the /CMD signal to issue a command of inquiring a portion changed in status on the engine side. In response to this, the engine controller uses the /STS signal to notify the printer controller of the status.

Figure 5:
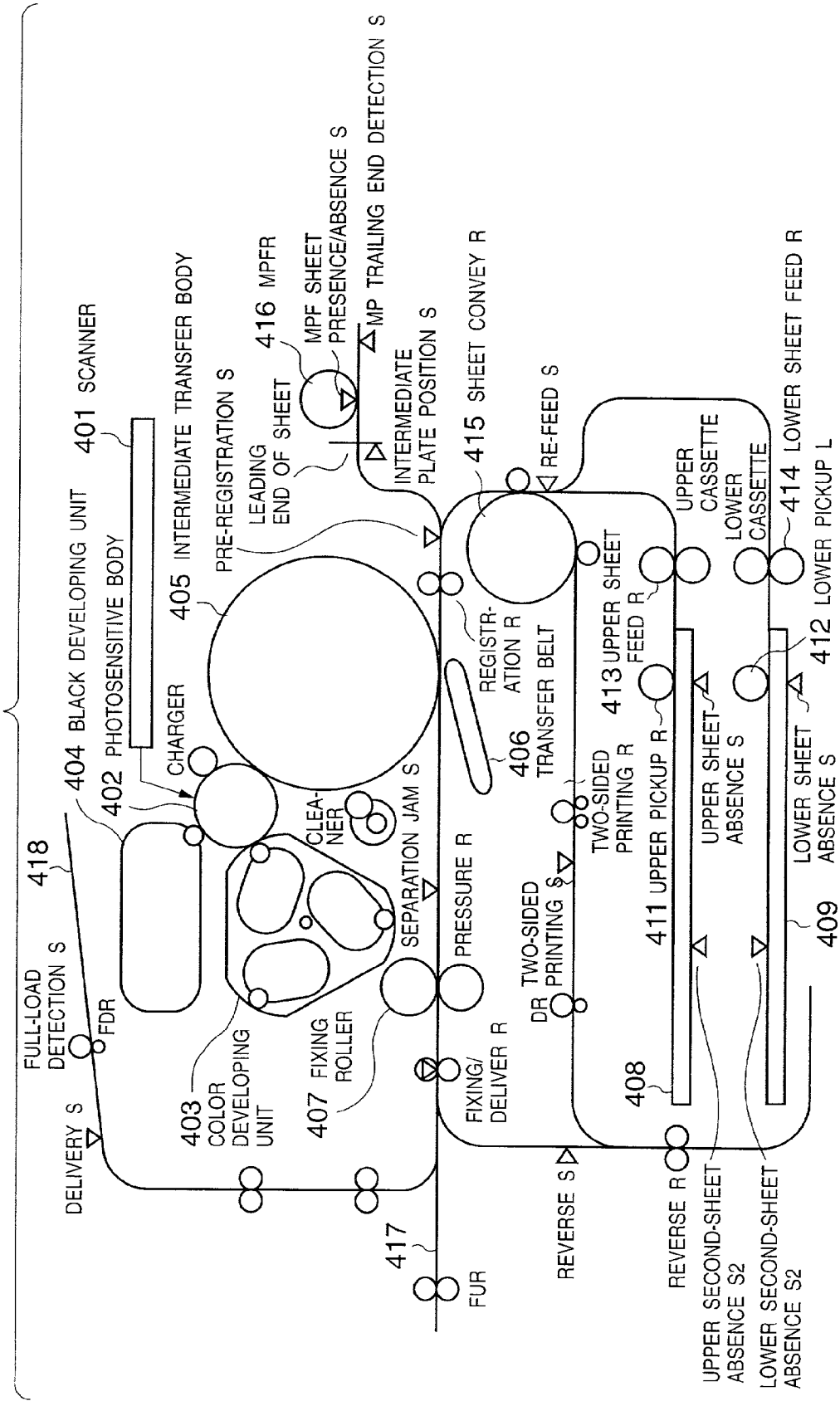
FIG. 5 is a sectional view schematically showing a printer mechanism and printing medium convey path.

The printer controlled by the engine controller will be described with reference to FIG. 5. FIG. 5 is a sectional view schematically showing a printer mechanism and printing medium convey path. An electrophotographic color printer is exemplified in FIG. 5.

Reference numeral 401 denotes a scanner which receives an image signal (/VDO) sent from the printer controller (not shown), irradiates a photosensitive body 402 with a laser beam corresponding to the image signal, and forms a charged image on the photosensitive body. The photosensitive body 402 rotates counterclockwise and reaches a black developing unit 404 or color developing unit 403. The developing units 403 and 404 apply toners (develop) to the photosensitive body in accordance with electric charges on the photosensitive body. Only the black developing unit 404 operates for a monochrome image, whereas both the developing units 403 and 404 are sequentially used for a color image. The toner image formed on the photosensitive body is transferred to an intermediate transfer body 405 which is in contact with the photosensitive body 402 and rotates clockwise. This intermediate transfer body is rotated once for a monochrome image, and four times for a color image, thereby transferring the monochrome or color image on the intermediate transfer body.

A printing medium such as a printing sheet fed from an upper cassette 408 or lower cassette 409 via a pickup roller 411 or 412 is conveyed by feed rollers 413 or 414, and further conveyed up to registration rollers 420 by a convey roller 415. To convey a printing sheet from a manual feed unit, the printing sheet is conveyed up to the registration rollers 420 by a convey roller 416.

The registration rollers 420 convey the printing sheet such that the printing sheet reaches the position between the intermediate transfer body and a transfer belt 406 at a timing when formation of a toner image on the intermediate transfer body 405 ends. When the printing sheet reaches this position, the transfer belt comes into contact with the intermediate transfer body via the printing sheet, and the toner image formed on the intermediate transfer body 405 is transferred to the printing sheet. The image transferred to the printing sheet is fixed to the printing sheet by the heat and pressure of fixing rollers 407.

The image-bearing printing sheet is conveyed to and delivered from either a faceup delivery port 417 or facedown delivery port 418 designated by the printer controller in advance. For two-sided printing, the printing sheet undergoes print processing again via a convey path 421. As a result, image information sent from the printer controller can be output.

Figure 6:
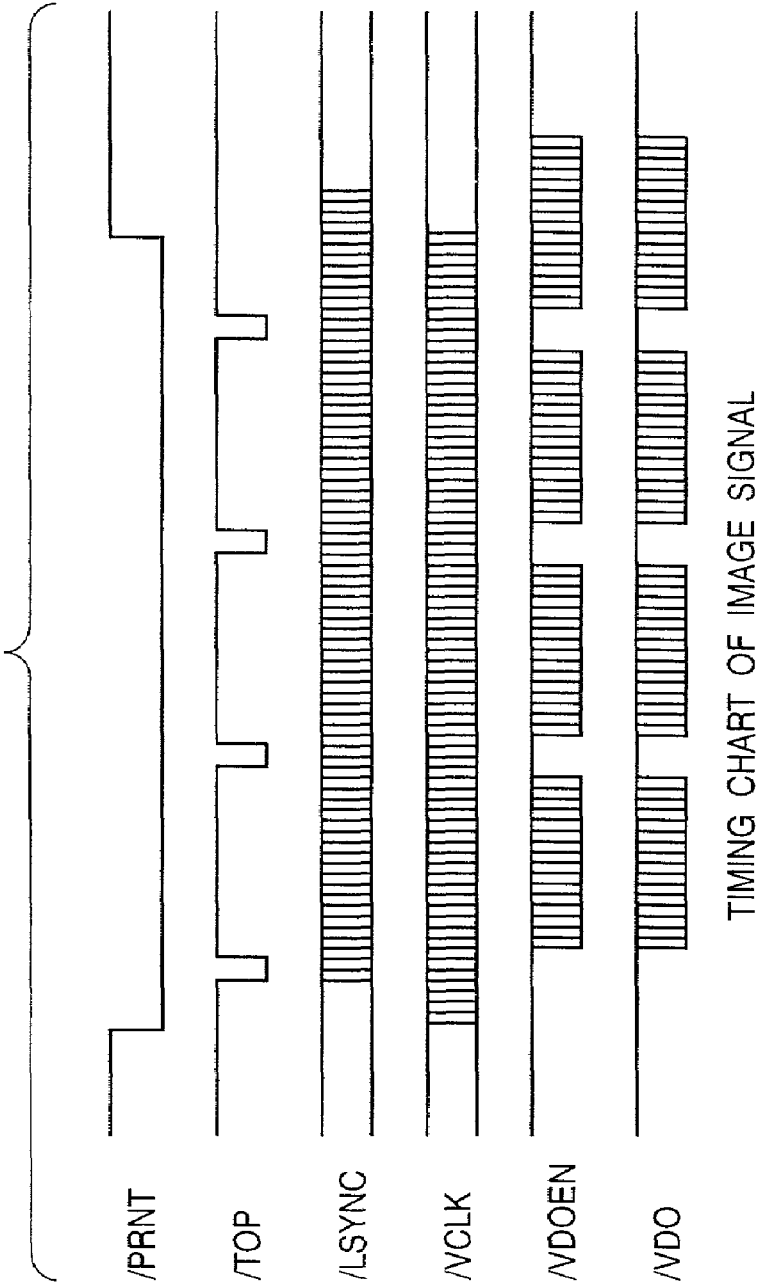
FIG. 6 is a timing chart showing the timings of signals exchanged via a video I/F.

FIG. 6 shows the timings of signals exchanged via the video I/F. FIG. 6 shows the above-described signals of the video I/F with the lapse of time.

When preparations for image information are completed, the printer controller sets the /PRNT signal to low (true) and notifies the engine controller of the completion of preparations. At the same time, the printer controller generates an image sync signal /VCLK used to transfer an image signal.

In response to this, the engine controller performs necessary processing such as various settings in the printer, and when reception of an image signal becomes possible, outputs the vertical sync signal /TOP and horizontal sync signal /LSYNC to the printer controller.

The printer controller transfers the image signal /VDO and image valid signal /VDOEN to the engine controller in response to the received /TOP signal and /LSYNC signal. The series of processes are repeated to perform entire printing.

Figure 7:
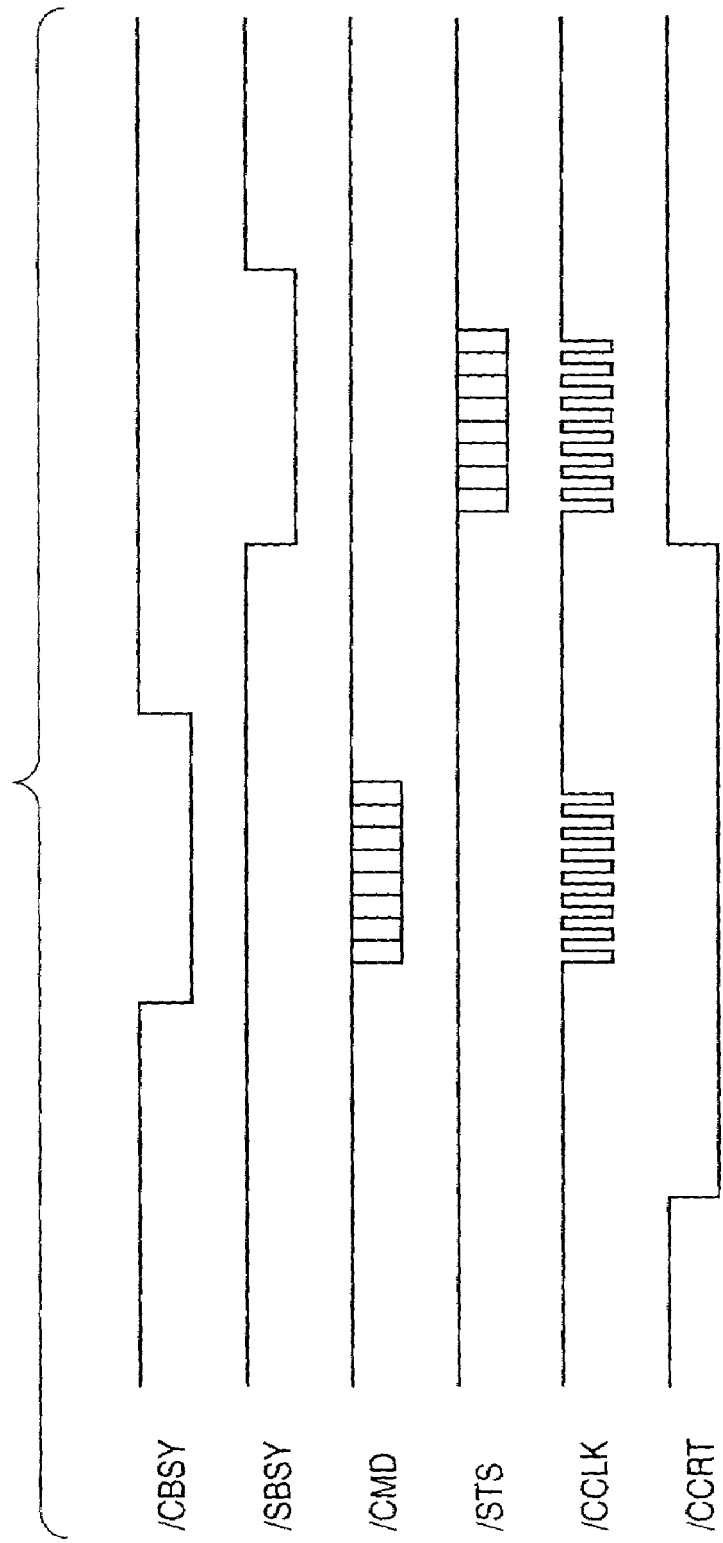
FIG. 7 is a timing chart showing communication timings between the printer controller and the engine controller.

Exchange of a command and status between the printer controller and the engine controller during print operation will be explained. FIG. 7 is shows communication timings between the printer controller and the engine controller. Communication is serial.

A case wherein the /CCRT signal on the lowest stage is not used will be described. To issue (transmit) a command to the engine controller, the printer controller sets the /CBSY signal to low (true) and sends command data on the /CMD signal in synchronism with the clock signal /CCLK. The engine controller having received the data checks whether the /CBSY signal is high (false), changes the /SBSY signal to low (true), and sends back engine-side status data corresponding to the command on the status signal /STS in synchronism with the /CCLK signal generated from the printer controller. The printer controller receives the status data, and continues or stops print control in accordance with the status.

A case wherein the /CCRT signal is used will be described. This signal changes to low (true) when the status on the engine side designated by the printer controller in advance changes. Assume that the printer controller sets by the signal /CMD that the /CCRT signal is enabled when sheets run out, that the number of remaining printing sheets is only one, and that the printer controller requests two printouts. Print sequence operation is normally processed for the first printout, but no second printing sheet exists. Thus, when formation of the second image starts, the printer engine detects a change in status and changes the /CCRT signal from high to low. This signal is transmitted to the printer controller. Immediately upon detecting this, the printer controller issues to the engine controller a command of requesting the sheet presence/absence status of a sheet feed unit in order to detect which sheet cassette is out of sheets. In accordance with this command, the engine controller sends back the status of out-of-sheet cassette to the controller. The /CCRT signal is cleared to high at a timing when the status-sending /SBSY signal changes to low.

Figure 8:
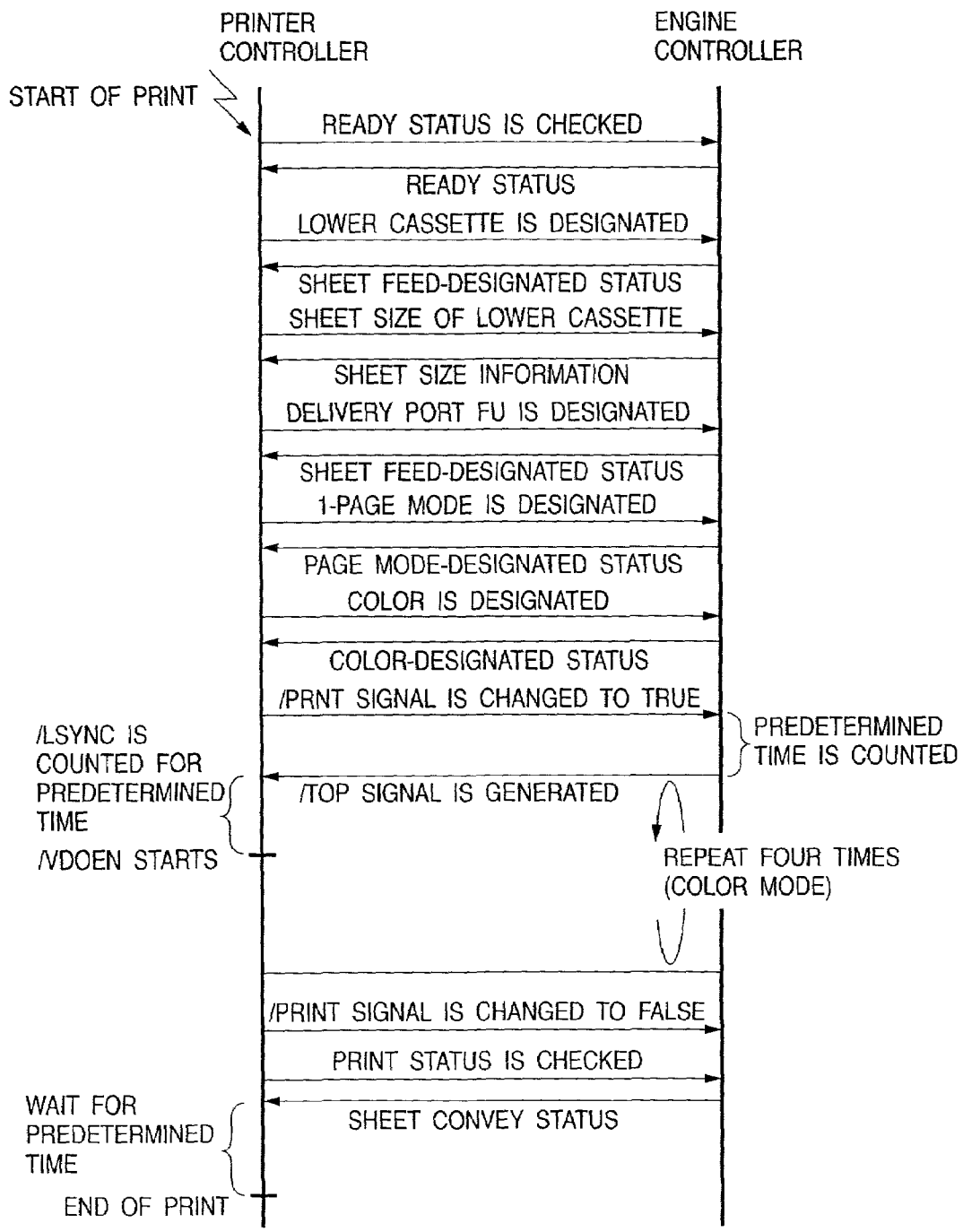
FIG. 8 is a view showing exchange of a command and status between the printer controller and the engine controller.

Detailed print operation will be explained with reference to FIG. 8 showing exchange of a command and status between the printer controller and the engine controller. FIG. 8 shows a case wherein a color output is done.

Upon reception of a print start request from the host computer or the like, the printer controller checks a printer ready status with respect to the engine controller while performing conversion processing or the like for image data to be printed. When receiving the ready status from the engine controller, the printer controller designates the lower cassette in FIG. 8 in which a command of designating the sheet feed stage of printing sheets is issued. The engine controller sends back a sheet feed status with respect to the cassette designation. Then, the controller issues a command of requesting information about the size of printing sheets in the designate cassettes, and the engine controller responds to this.

After sheet feed information is exchanged, the printer controller issues a deliver FU designation command of designating a delivery port, and the engine controller sends back the status of the designated delivery port. A page mode designation command of designating the number of pages of images to be formed and a monochrome/color designation command are issued, and responses to these commands are repeated, thereby completing all the settings on the printer side.

After the printer is set, the printer controller generates a print request to the engine controller (changes /PRNT to true), and generates a clock signal (/VCLK). The engine controller waits for a predetermined time after the /PRNT signal becomes true, and outputs the /TOP signal and horizontal sync signal (/LSYNC). Upon reception of the /TOP signal, the printer controller counts the /LSYNC signal for a predetermined time, and transfers an image signal (/VDO) to the engine controller in synchronism with the /VCLK signal while synchronizing the vertical scanning direction with the /TOP signal and the horizontal scanning direction with the /LSYNC signal. In this case, a color mode is set, and data transfer processing is repeated until images of four, C, M, Y, and K colors are formed and processing of one page ends.

The printer controller returns the /PRNT signal to high (false) after receiving the final /TOP signal. The engine controller detects the end of the print request by confirming the status (false) of the /PRNT signal at the end timing of image formation processing. Then, the engine controller shifts to post-processing such as cleaning operation of the intermediate transfer body. A printing sheet bearing a toner image after print processing passes through the fixing rollers and is delivered from a designated delivery port. The printer controller issues a print status request to the engine controller. After confirming a response representing no printing sheet convey status (end of deliver) from the engine controller, the printer controller changes to a print end status upon a predetermined wait time, and stands by in a ready status until the next print request is generated.

If an illegal status such as jam of a printing sheet, the absence of printing sheets, or door open operation by the user is generated during the above operation, the engine controller uses the /CCRT signal or the like to immediately notify the printer controller of the printer abnormality. The printer controller executes remedy processing.

Processing between the printer controller and the engine controller has been described.

[Arrangement when Reader Controller is Mounted]

Figure 9:
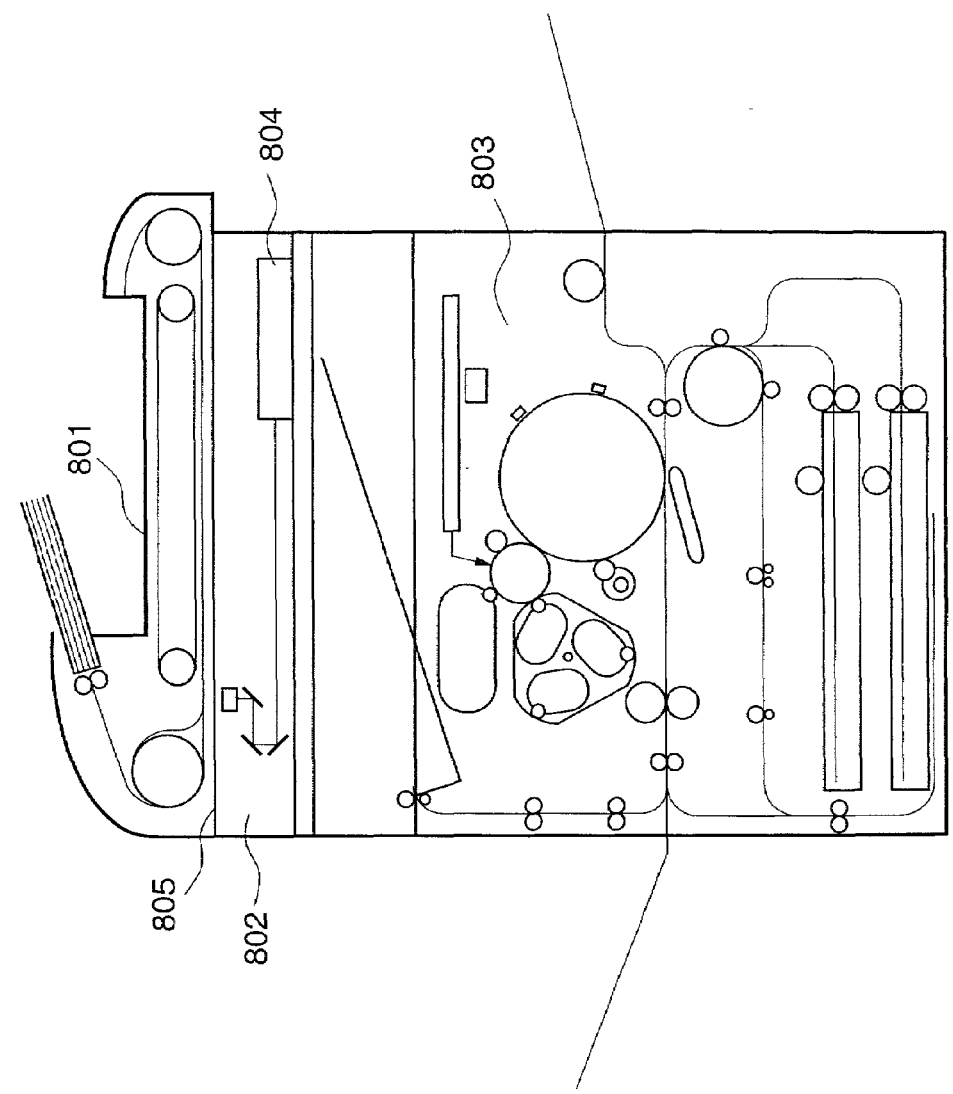
FIG. 9 is a sectional view when the printer main body incorporates a reader controller.

FIG. 9 is a sectional view when the printer main body incorporates a reader controller for optically reading an original image on a sheet in addition to image data output from the printer controller based on data transferred from the host computer, converting the read data into a digital signal, and outputting the digital signal.

Reference numeral 801 denotes an original feeder for conveying an original to an optical reading unit; 802, an optical reader; and 805, an original glass table of the optical reader. The original feeder 801 operates in synchronism with the optical reader 802. When the original feeder 801 feeds an original onto the original glass table 805, the reading unit incorporated in the optical reader 802 scans the image while moving in the right-and-left direction in FIG. 9, and emits reflected light having undergone proper optical processing to a photoelectric converter 804. Reference numeral 803 denotes a printer main body.

Figure 10:
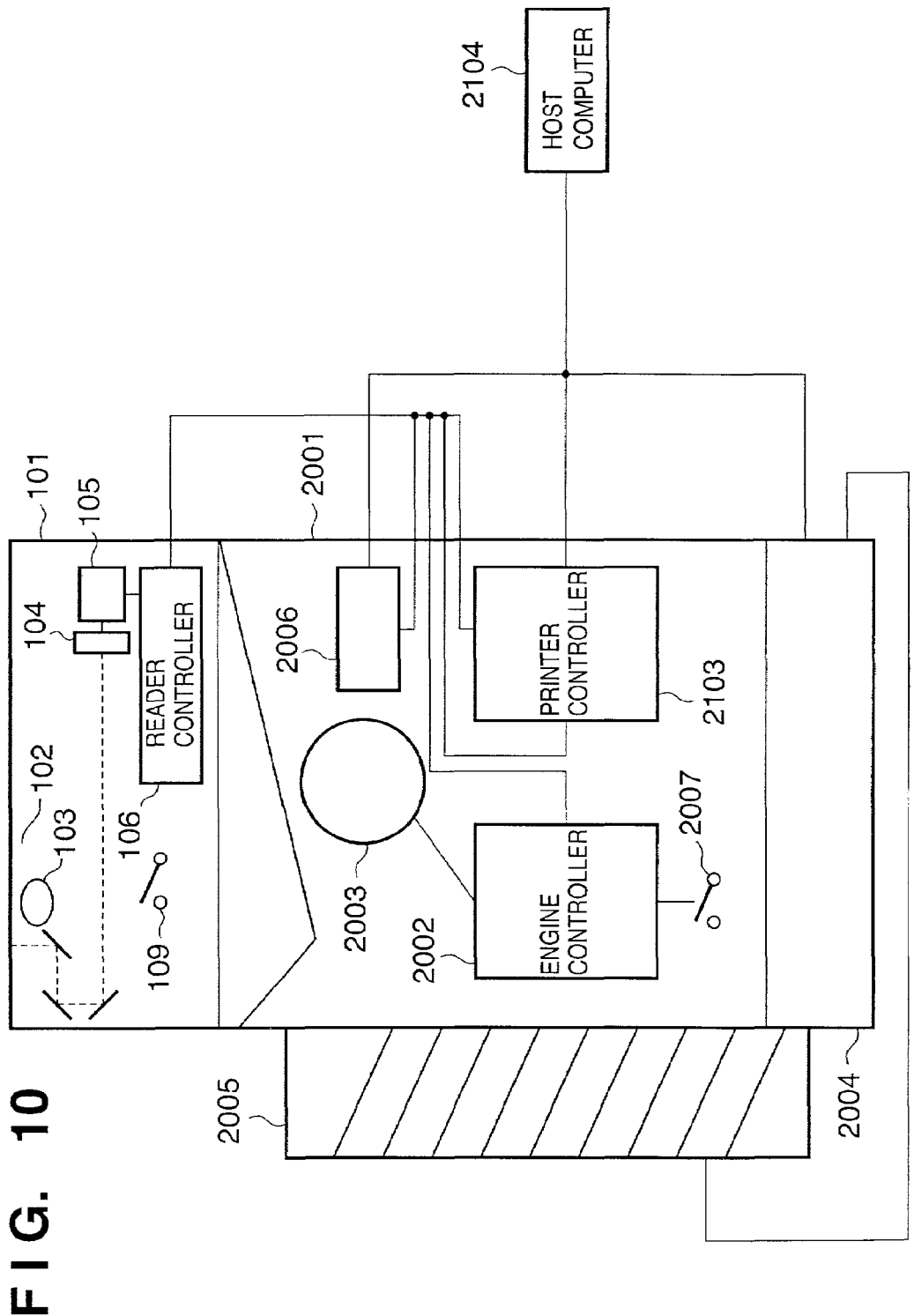
FIG. 10 is a sectional view showing the main part of an apparatus having the arrangement of FIG. 9.

FIG. 10 is a sectional view showing the main part of an apparatus having the arrangement of FIG. 9 and showing an arrangement obtained when the optical reader (reader) is added to the arrangement shown in FIG. 2. In FIG. 10, the same reference numerals as in FIG. 2 denote the same parts.

In FIG. 10, reference numeral 101 denotes a reader frame; 102, an original table; 103, a light source; 104, a photoelectric conversion means; 105, an A/D conversion means; 106, a reader controller; 2001, the printer main body; 2002, the engine controller for controlling sheet convey and image formation of the printer; 2003, the image forming unit; 2103, the printer controller incorporated in the printer main body 2001; 2104, the host computer connected to the printer controller 2103 in one-to-one correspondence or via the network 2105; 2004, the sheet cassette deck which can be added as an option; 2005, the sorter which can be added as an option; and 2006, the option controller for controlling the optional cassette deck and optional sorter.

The reader controller 106 has a means for processing a digital image output from the A/D conversion means, a motor control means (not shown) for reading an image, and a function of controlling communication with the engine controller 2002 and printer controller 2103. In the present invention, the reader controller 106 is arranged in the printer main body 2001 so as not to use an external cable for controlling communication with the engine controller 2002 and printer controller 2103.

Figure 11:
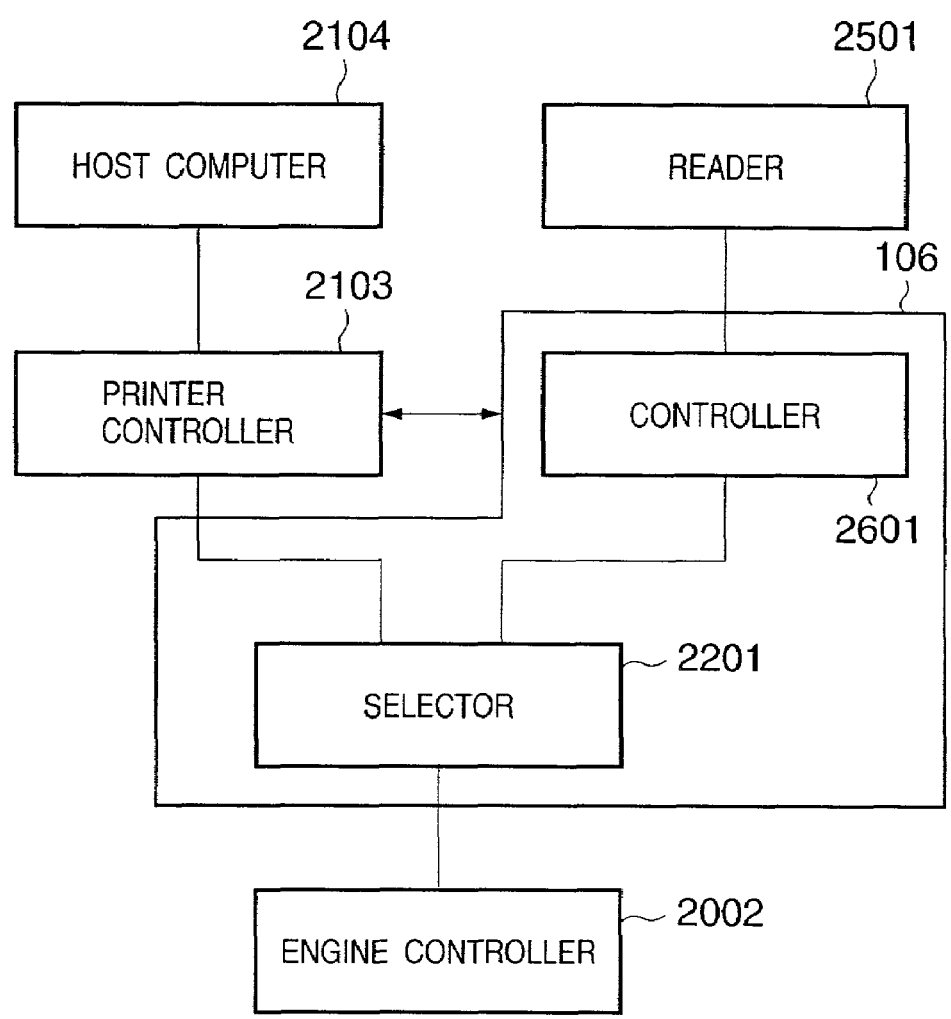
FIG. 11 is a block diagram showing a signal transmission path in the apparatus shown in FIG. 10.

FIG. 11 is a block diagram showing a signal transmission path in the apparatus shown in FIG. 10. As shown in FIG. 11, all the signals between the host computer, the printer controller 2103, and the engine controller 2002 and all the signals between a reader 2501, the reader controller 106, and the engine controller 2002 pass through a selector 2201 in the reader controller. In FIG. 11, all the building components of the reader except for the reader controller 106 are represented as the reader 2501. In FIG. 11, the selector 2201 is arranged in the reader controller 106, but the selector may be arranged in the engine controller by exchanging the positions of the reader controller and engine controller or may be separated from the reader controller and engine controller.

Figure 12:
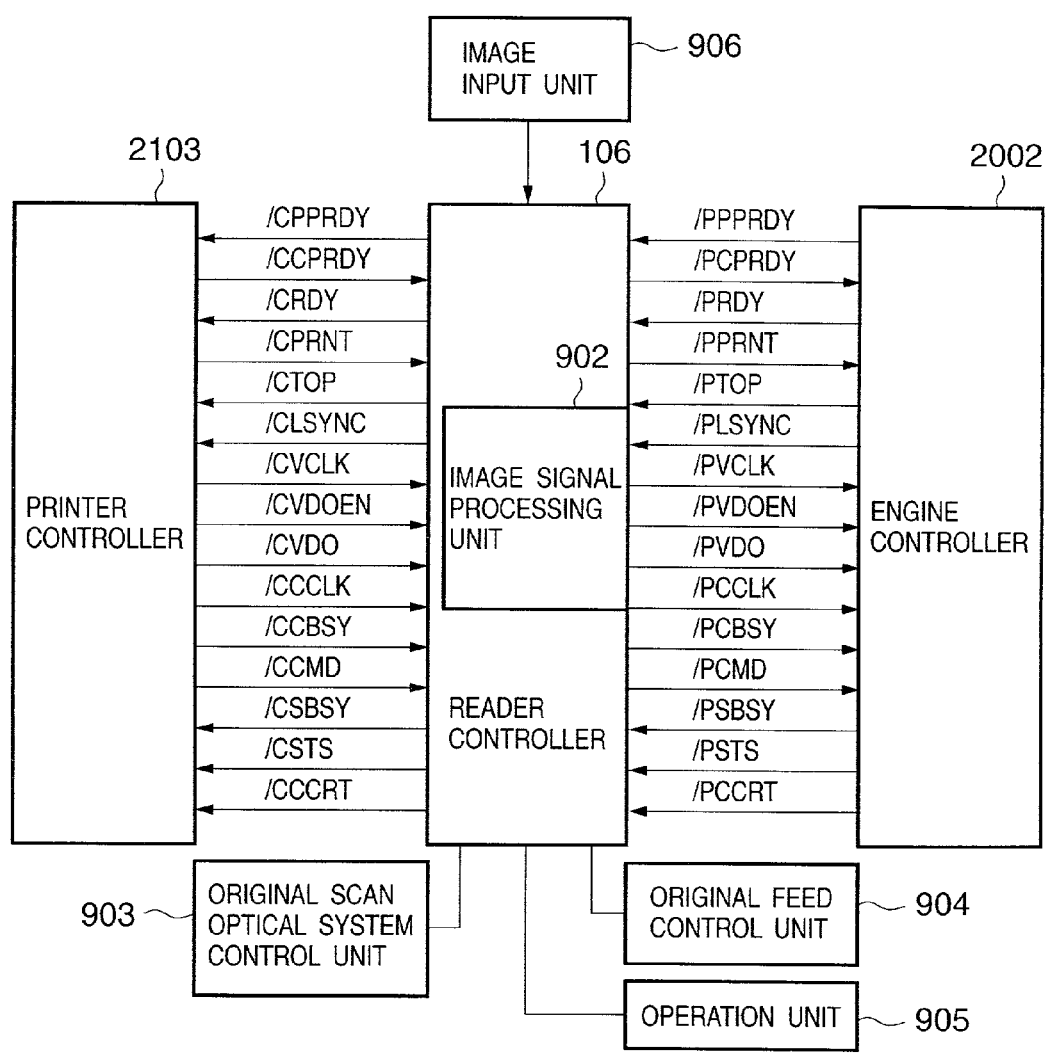
FIG. 12 is a block diagram showing the electrical connection between the printer controller, the engine controller, and the reader controller in the arrangement shown in FIG. 10.

FIG. 12 is a block diagram showing the electrical connection between the printer controller, the engine controller, and the reader controller in the arrangement shown in FIG. 10. The reader controller 106 is located at the electrically intermediate position between the printer controller 2103 and the engine controller 2002 in FIG. 3 showing an arrangement before the reader is mounted. The types of signal lines between the printer controller 2103 and the reader controller 106 and between the engine controller 2002 and the reader controller 106 have the same functions as those of the types of signal lines shown in FIG. 3. Note that signals between the printer controller 2103 and the reader controller 106 are physically different from signals between the engine controller 2002 and the reader controller 106. In the following description, these signals are distinguished by adding "C" to the signal names of signals between the printer controller 2103 and the reader controller 106 and "P" to the heads of the signal names of signals between the reader controller 106 and the engine controller. Signals assigned neither "C" nor "P" mean common signals.

Reference numeral 902 denotes an image signal processing unit; 903, an original scan optical system control unit for controlling the optical reader 802 in FIG. 9; 904, an original feed control unit for controlling the original feeder 801; 905, an operation unit; and 906, an image input unit. An image signal converted by the photoelectric converter 804 in the optical reader 802 is input from the image input unit 906 to the reader controller 106, and transferred to the internal image signal processing unit 902.

Figure 13:
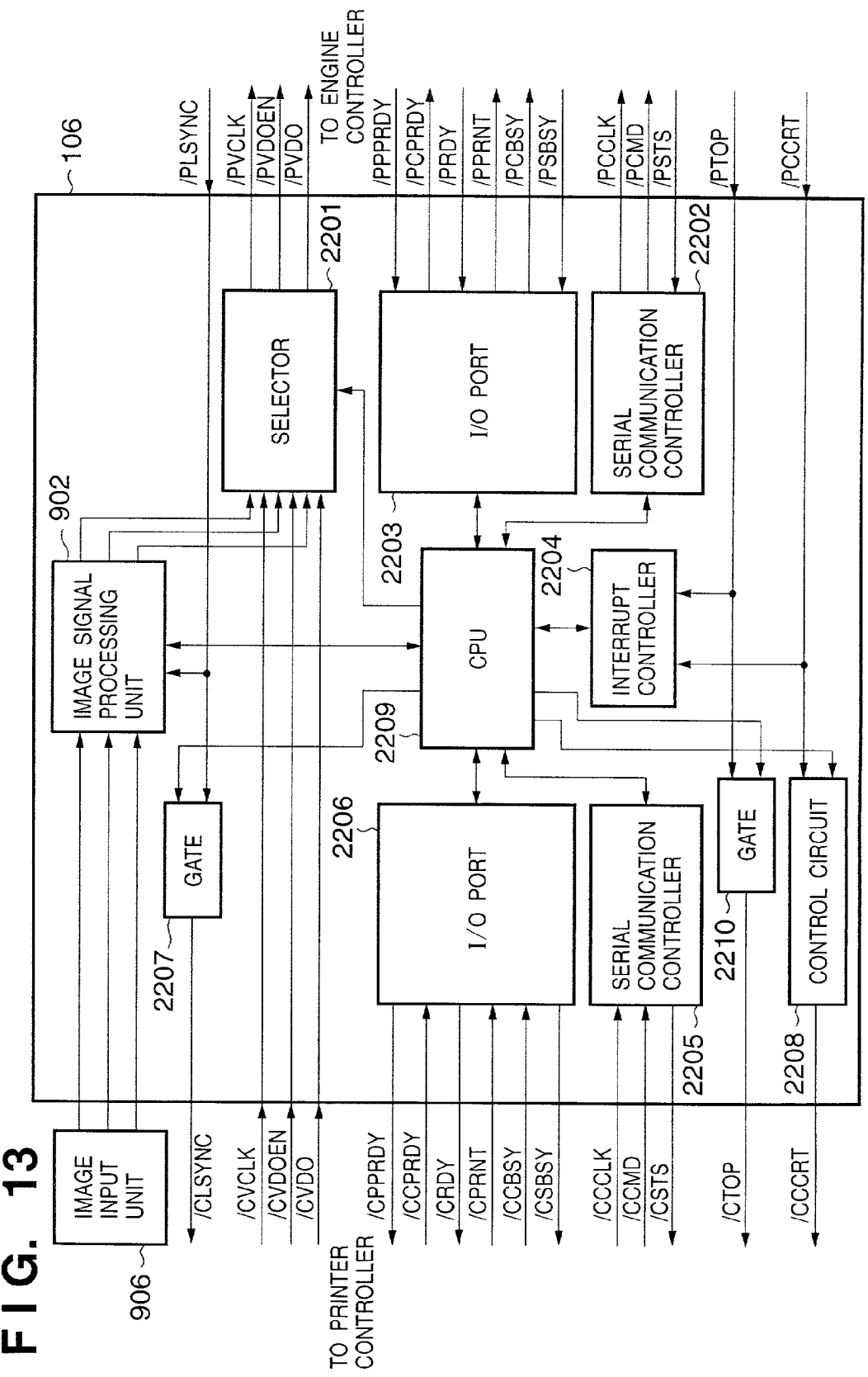
FIG. 13 is a block diagram showing a portion of the reader controller that is associated with the printer controller and engine controller.

The arrangement of the reader controller will be explained in detail. FIG. 13 is a block diagram showing a portion associated with the printer controller and engine controller in the arrangement of the reader controller 106.

In FIG. 13, reference numeral 902 denotes the image signal processing unit shown in FIG. 12; 906, the image input unit shown in FIG. 12; 2201, the selector for selecting either of an output from the image input unit 906 and a signal sent from the printer controller 2103 and outputting the selected signal to the engine controller 2002. Signal systems switched by the selector are three, image clock /VCLK, image enable signal /VDOEN, and image data /VDO. Reference numeral 2202 denotes a serial communication controller for communicating with the engine controller; 2203, an I/O port for exchanging signals for compensating for communication in the communication controller; and 2204, an interrupt controller. The interrupt controller receives an image leading end request signal /PTOP and printer status change signal /PCCRT.

Reference numeral 2205 denotes a serial communication controller for communicating with the printer controller; 2206, an I/O port for exchanging signals for compensating for communication in the communication controller; and 2207 and 2210, first and second gates for controlling whether to send to the printer controller a signal transmitted from the printer. The gates are controlled by an image leading end request signal /TOP and line sync signal /LSYNC. Reference numeral 2208 denotes a control circuit which has a gate function and flag set function and controls a printer status change signal /CCRT. Whether to transfer the printer status change signal /PCCRT issued by the engine controller to the printer controller is controlled by opening/closing the gate. By setting the flag, the printer status change signal /CCCRT can be issued from the reader controller to the printer controller.

[Copying Operation]

An operation when a full-color original image is read and output from the image forming apparatus will be explained with reference to FIGS. 9, 12, and 13. When a copying start key (not shown) on the operation unit 905 is pressed, the reader controller 106 recognizes the copying mode, closes the gates 2207 and 2210, turns off the control circuit 2208, and sets the selector 2201 so as to output a signal from the image signal processing unit 902.

The reader controller 106 checks the printer ready status signal /PPRDY from the engine controller 2002 via the I/O port 2203. The reader controller 106 performs various settings in the engine controller in the above-mentioned way by using the serial communication controller 2202. In other words, the reader controller 106 sequentially issues a command of designating the sheet feed stage of printing sheets and a command of requesting the printing sheet size of the designated sheet feed stage. The engine controller sends back statuses corresponding to the series of commands.

The reader controller 106 determines a delivery port by a delivery port designation command and issues a page mode designation command of designating the number of pages of images to be formed. The reader controller 106 issues a command of designating monochrome/color printing and ends all the settings on the printer side.

After the original feeder 801 feeds an original to the original table via the original feed control unit 904, the reader controller generates a print request /PPRNT signal to the engine controller. In response to this, the engine controller sends back the /PTOP signal after a predetermined time. The interrupt controller 2204 which received the /PTOP signal outputs an interrupt to a CPU 2209, and the CPU 2209 controls the optical system control unit 903 so as to operate the optical reader 802 in synchronism with the /PTOP signal. A signal input from the photoelectric converter 804 to the image signal processing unit 902 is transferred as the /PVDO signal to the engine controller in synchronism with the /PVCLK signal while synchronizing the vertical scan direction with the /PTOP signal and the horizontal scan direction with the /PLSYNC signal. Since a color mode is set in this case, the optical reader 802 is operated four times, and images of four, C, M, Y, and K colors are formed with respect to four generated /PTOP signals.

Upon reception of the final /TOP signal, the printer controller returns the /PRNT signal to high (false). The engine controller detects the end of the print request and shifts to post-processing such as cleaning operation of the intermediate transfer body. A printing sheet bearing a toner image after print processing passes through the fixing rollers and is delivered from a designated delivery port. The printer controller issues a print status request to the engine controller. After confirming a response representing no printing sheet convey status (end of deliver) from the engine controller, the printer controller changes to a print end status upon a predetermined wait time, and stands by in a ready status until the next print request is generated.

[Print Operation]

A method when an image from the printer controller is output (printed) from the image forming apparatus will be described. The reader controller 106 changes to a ready status when copying operation ends. At this time, the reader controller opens the gates 2207 and 2210 and turns off the control circuit 2208 for the sake of print operation. The reader controller checks a printer ready status signal /PRDY from the engine controller via the I/O port 2203. If the printer ready status signal /PRDY is enabled, the reader controller 106 sets a printer ready status signal /CRDY in the printer controller via the I/O port 2206.

The printer controller performs the same communication with the reader controller as conventional communication with the engine controller for the purpose of various settings. The reader controller communicates with the printer controller by using the serial communication controller 2205. The reader controller interprets received data from the printer controller by using the CPU 2209 and performs various settings with respect to the engine controller in accordance with the contents of the data. The reader controller communicates with the engine controller by using the serial communication controller 2202. The engine controller sends back, to the reader controller, statuses corresponding to a series of commands issued from the reader controller, and the reader controller receives the statuses by using the serial communication controller 2202. The received contents are interpreted by the CPU 2209 and transmitted to the printer controller by using the serial communication controller 2205.

The printer controller generates a print request /CPRNT signal to the reader controller, and the reader controller which received this signal generates a print request /PPRNT signal to the engine controller. In response to this, the engine controller sends back the /PTOP signal after a predetermined time. Since the gate 2210 is open, the /PTOP signal directly reaches the printer controller as a /CTOP signal. The printer controller transfers the /CVDO signal to the reader controller in synchronism with the /CLSYNC signal received via the gate controller 2207 while synchronizing the vertical scan direction with the /CTOP signal, i.e., in synchronism with the /CVCLK signal while synchronizing the horizontal scanning direction with the /PLSYNC signal. In the reader controller, the selector 2201 is set to select a signal sent from the controller. The /CVCLK, /CVDOEN, and /CVDO signals sent from the controller are respectively transmitted as /PVCLK, /PVDOEN, and /PVDO to the engine controller.

[Difference Between Print Operation and Copying Operation]

The difference between print operation and copying operation will be described in terms of the image output timing.

A detailed description of the arrangement of the printer controller 2103 will be omitted. The printer controller 2103 incorporates an image memory where image data to be printed is prepared in advance. Only an electrical delay time is required until the printing data /VDO can be output upon reception of the image leading end request signal /TOP sent from the engine controller.

Figure 14:
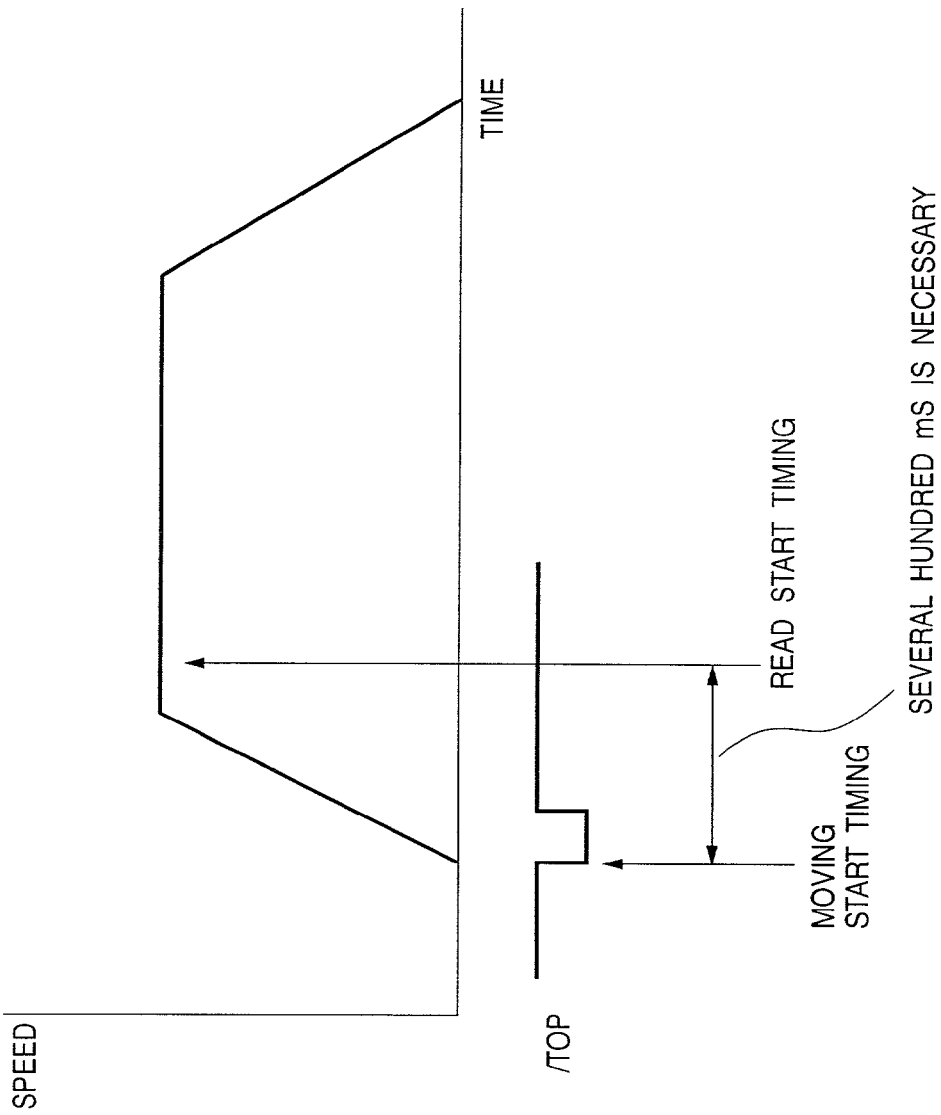
FIG. 14 is a graph showing the difference in timing between copying and printing.

To the contrary, in the copying mode, an original is read to output image data, while the optical reader 802 is moved. As shown in FIG. 14, an acceleration time is required by changing the idle reader to a status in which the reader moves at a high original read speed. This time is, e.g., about several hundred ms. If the engine controller sends the image leading end request signal /TOP in the copying mode at the same timing as a signal in the print mode, the image data /VDO reaches the engine controller with a delay of several hundred ms in the copying mode. This time difference can be reduced by the following two methods.

1. /TOP is sent earlier in the copying mode than in the print mode.
2. Another signal (RESTART) is used for the copying mode.

Figure 15:
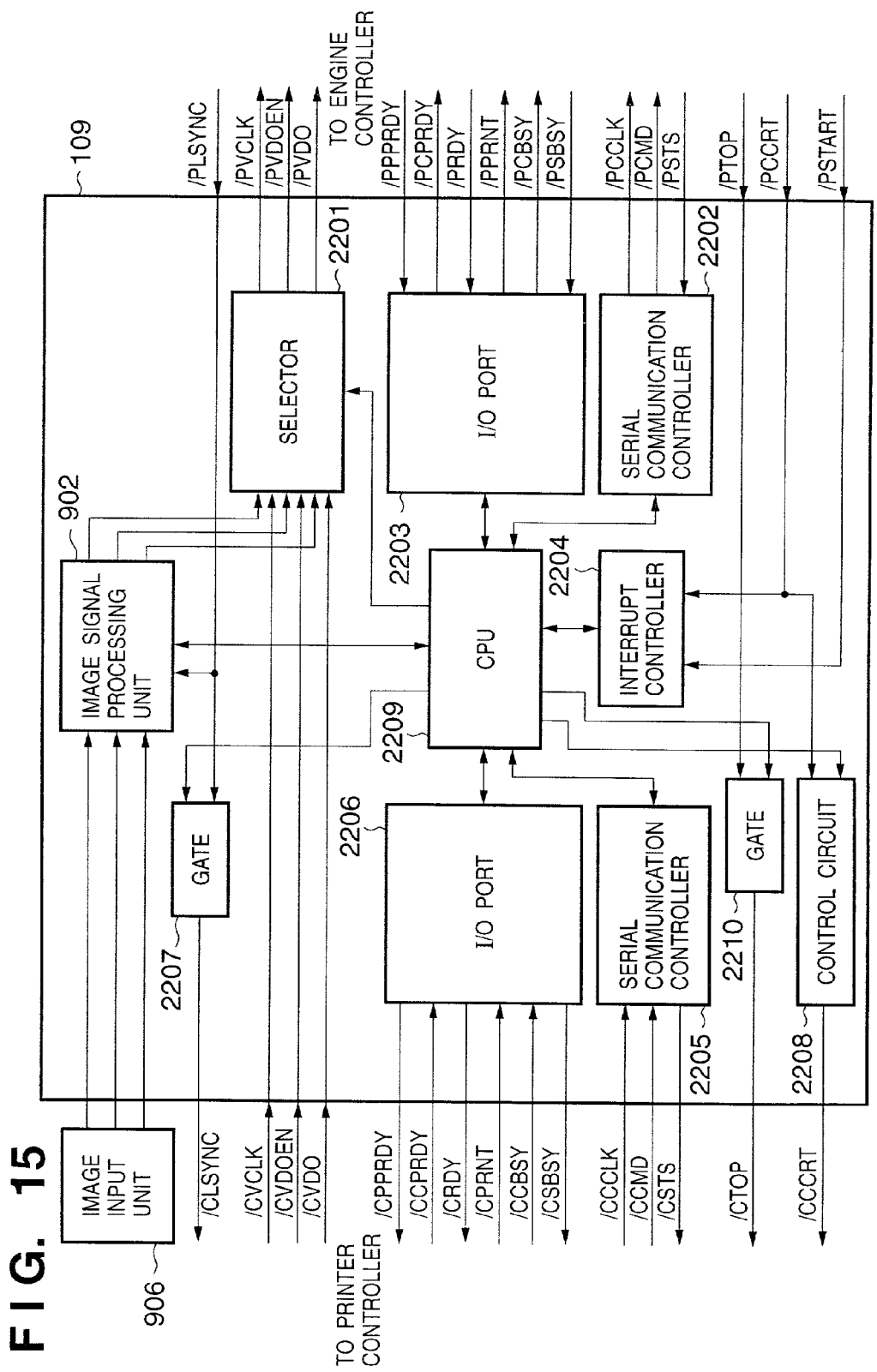
FIG. 15 is a block diagram showing another arrangement of the reader controller.

In method 1, the arrangement of the reader controller 106 in FIG. 13 need not be changed, and the reader controller starts moving the original reader upon reception of the /TOP signal in the copying mode. More specifically, the reader controller 106 sends /TOP earlier in consideration of the delay of mechanical operation so as to make the moving start timing coincide with the read start timing in FIG. 14. In method 2, an arrangement shown in FIG. 15 is adopted. The arrangement in FIG. 15 is different from that in FIG. 13 in that a new signal /RSTART is input to the interrupt controller 2204 instead of the /PTOP signal. This arrangement is effective because the image leading end request signal /PTOP sent from the engine controller is necessary only when the printer controller executes print operation, and need not be input to the interrupt controller of the reader controller, and because the reader moving start request signal /RSTART sent from the engine controller is necessary only in the copying mode and need not be sent to the printer controller. In the arrangement of FIG. 15, the engine controller sends the /RSTART signal at a timing considering the operation delay of the original reader. This can reduce the time difference between the modes.

[Control for Setting Command]

As described above, the reader controller is connected between the printer controller and the engine controller. The printer controller and engine controller communicate with each other via the reader controller. The following description concerns an operation when the printer controller issues a setting command, e.g., sheet cassette change command to the printer while the reader controller reads and outputs an original image by using the optical system controller.

Figure 16B:
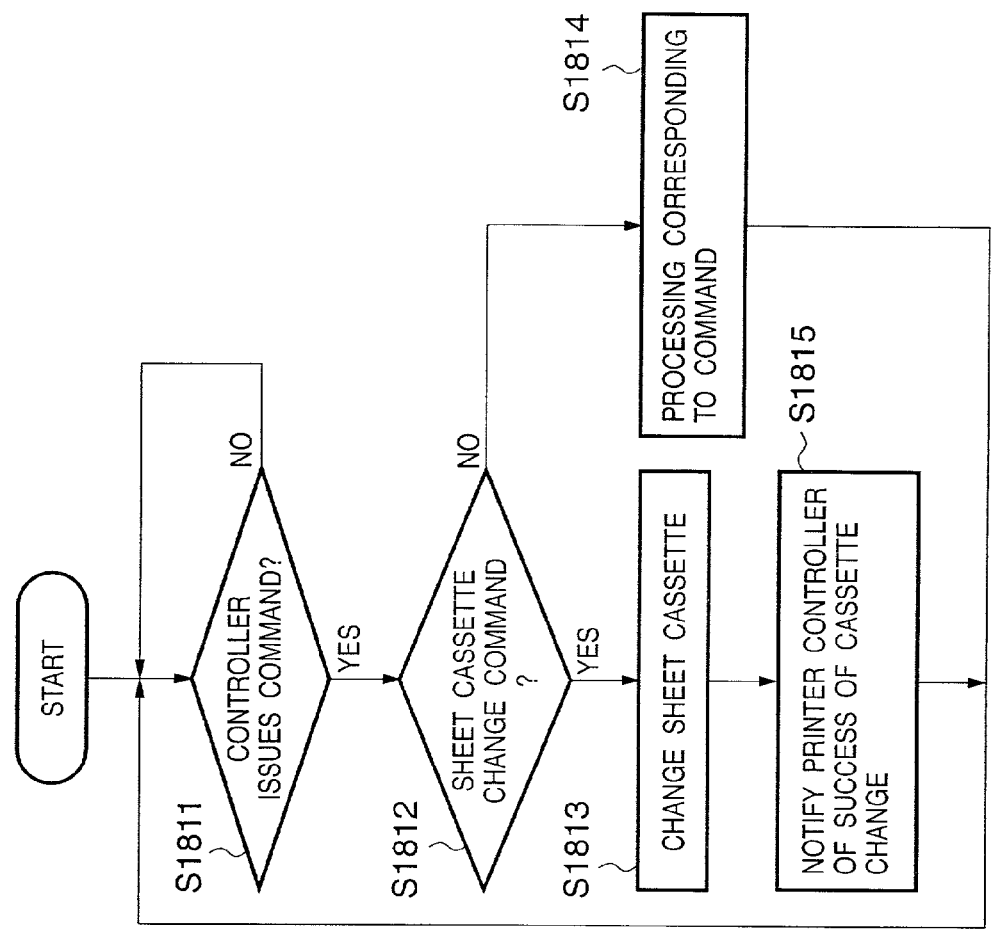
FIGS. 16A and 16B are flow charts each showing a command issuing sequence in the absence of the reader controller.
Figure 16A:
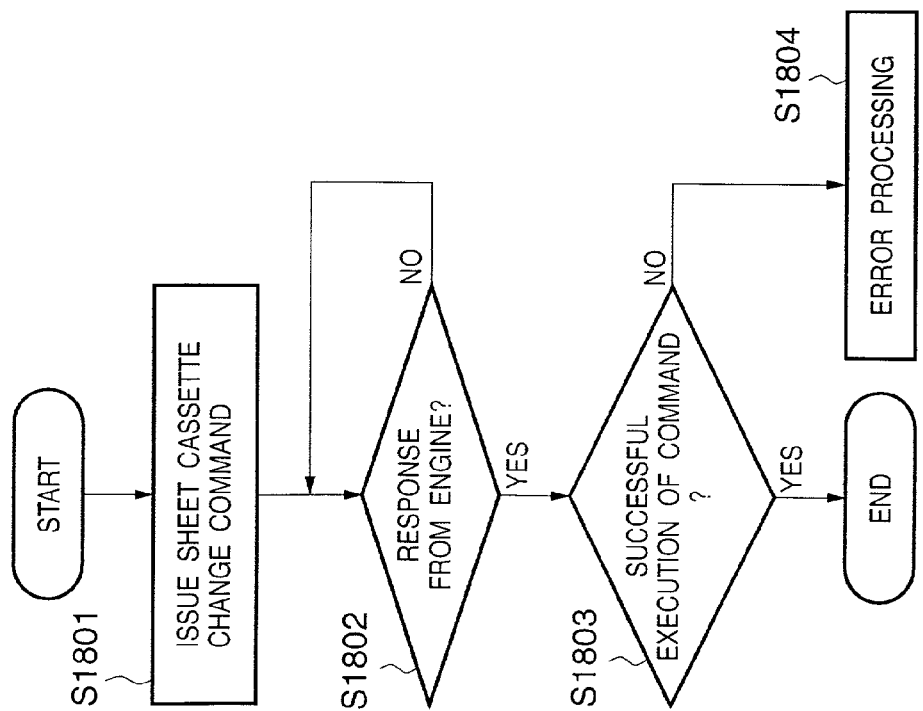

For descriptive convenience, a command issuing sequence when no reader controller is used, i.e., in the arrangement of FIG. 3 will be explained with reference to FIGS. 16A and 16B. FIG. 16A shows a processing sequence in the printer controller, and FIG. 16B shows a processing sequence in the engine controller.

The printer controller issues a sheet cassette change command (S1801) and waits for a response from the engine controller (S1802). Upon receiving the response, the printer controller determines whether the command was successfully executed (S1803), and ends the command issuing sequence. The engine controller waits for a command to be issued from the printer controller (S1811), and if a command is issued, checks the contents of the command (S1812). For the sheet cassette change command, the engine controller changes the sheet cassette (S1813), and if the sheet cassette was successfully changed, notifies the printer controller of the success of command execution (S1815). Then, the engine controller returns to the command wait status. For a command other than the sheet cassette change command, the engine controller performs processing corresponding to the command (S1814) and returns to the command wait status.

A processing sequence when the reader controller is added will be explained with reference to FIGS. 17 and 18. Note that the printer controller and engine controller execute the same control as shown in FIGS. 16A and 16B.

Figure 17:
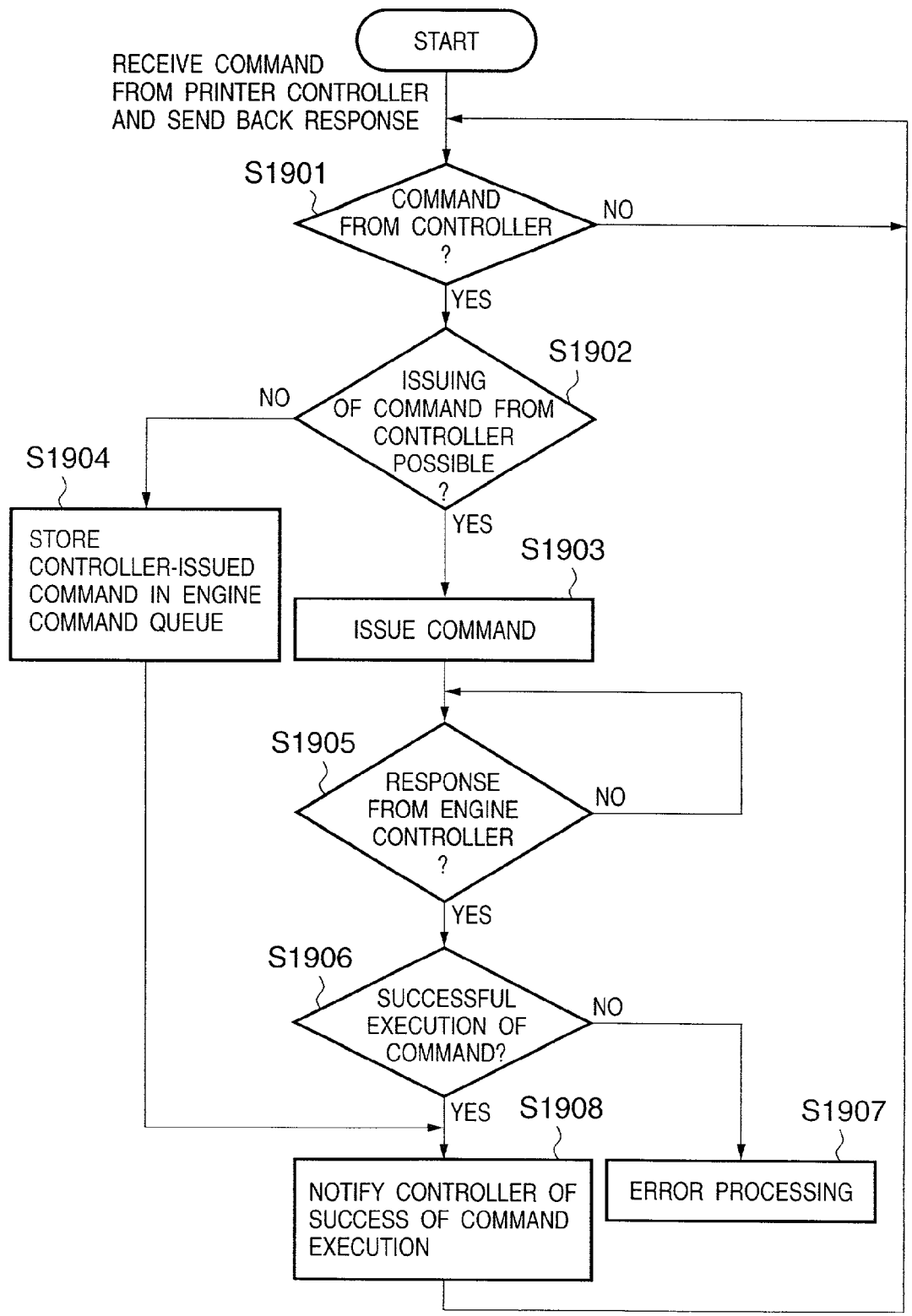
FIG. 17 is a flow chart showing a communication sequence when the reader is mounted.
Figure 18:
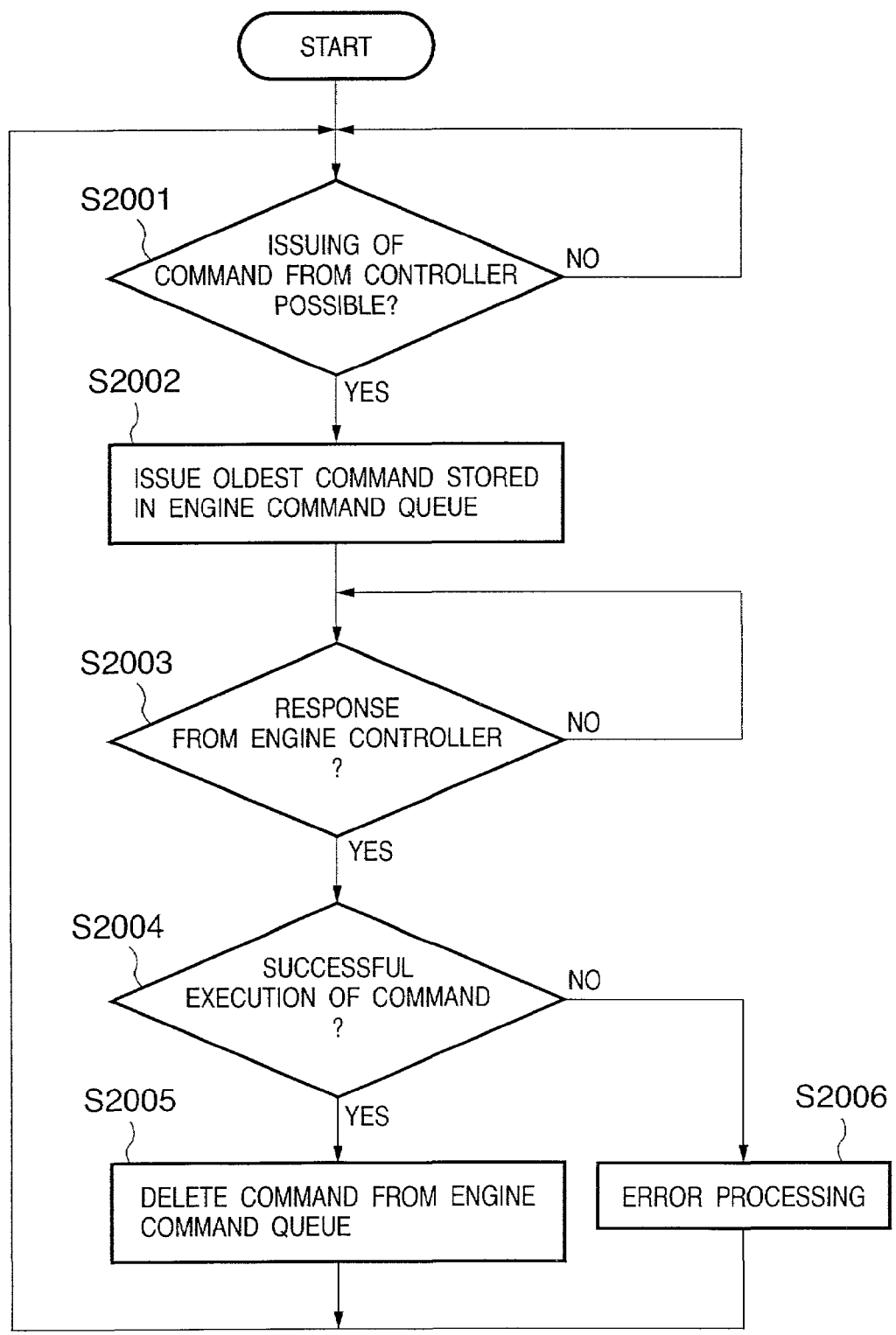
FIG. 18 is a flow chart showing a communication sequence when the reader is mounted.

FIG. 17 is a flow chart showing control of receiving a command from the printer controller and sending back a status to the printer controller. The reader controller receives a command from the printer controller via the signal line /CCMD shown in FIG. 12 by using the serial communication controller 2205 (S1901), and determines whether the received command can be immediately sent to the engine controller (S1902).

For example, when the reader controller can issue a command to the engine controller in order to perform copying mode operation because there is no instruction in progress, the reader controller issues via a signal line /PCMD the same command as the command sent from the printer controller by using the serial communication controller 2202 (step S1903). The reader controller waits for a response to the issued command (S1905), and upon receiving a response representing that the command was normally executed, notifies the printer controller of the success of execution (S1908). If execution of the command fails, the reader controller performs predetermined error processing, e.g., reissues a command (S1907).

To the contrary, when copying operation is not normally executed if the reader controller directly issues the sheet cassette change command sent from the printer controller to the engine controller because, e.g., the reader controller designates a sheet cassette and executes copying operation, the reader controller does not issue any command to the engine controller, and stores the command in an engine command queue where commands issued from the printer controller to the engine controller are stored in the issuing order (S1904).

Since the reader controller has to send back a response to the command to the printer controller, the reader controller sends back a pseudo notification representing that the command was successfully executed, to the printer controller via a signal line /CSTS by using the serial communication controller 2205 (S1908).

Processing of a command stored in the engine command queue will be explained with reference to FIG. 18. If the reader controller changes to a status in which it can issue a command received from the printer controller to the engine controller without influencing the status of the reader controller (YES in S2001), the reader controller issues the oldest command stored in the engine command queue to the engine controller via the signal line /PCMD by using the serial communication controller 2202 (S2002), and waits for a response (S2003). Note that a command issued by the reader controller itself is also transmitted to the engine controller via the signal line /PCMD.

After the engine controller completes execution of the command, the reader controller receives the response via the signal line /PSTS (S2004). If execution succeeds, the reader controller deletes the successful command from the engine command queue (S2005). If execution of the command fails, the reader controller processes it as an error generation status (S2006).

In this way, when the reader controller is interposed between the printer controller and the engine controller, the command processing sequence can be achieved without any operational inconsistency in issuing a normal command from the printer controller to the engine controller.

[Control to Status Change Signal]

The following description concerns processing when the engine controller uses /PCCRT to transmit to the reader controller that the status on the engine side changes, e.g., an error occurs when the reader controller is interposed between the printer controller and the engine controller.

When the reader controller is interposed, the type of printer status whose change is to be detected may be different between the reader controller and the printer controller. This occurs when, e.g., a sheet during conveyance jams.

If jam occurs while the engine performs copying operation under the control of the reader controller, only the reader controller wants to know this status. The printer controller cannot execute appropriate post-processing even if it knows this status because the jam does not occur during output from the printer controller.

If a control system identical to the reader controller is to be mounted in the printer controller, jam processing control software which should exist in one of the controllers is repetitively installed in the two controllers. This is very wasteful in terms of the number of design steps, quality evaluation, and software capacity.

It, therefore, suffices to notify the printer controller of a status change in the print mode and the reader controller of a status change in the copying mode. Even in the copying mode, however, the printer controller sometimes wants to receive an engine status change signal. For example, the printer controller must be notified of information about a change in cassette size or the absence of sheets. Such a change does not require a strict time until each controller performs processing after the engine controller issues a status change signal.

For this reason, the following processing is done. In the copying mode in which the reader controller controls the engine controller in the arrangement of FIG. 13, a status change signal /PCCRT sent from the engine controller by using the control circuit 2208 is not transmitted to the printer controller but received by only the reader controller via the interrupt controller 2204.

Figure 19:
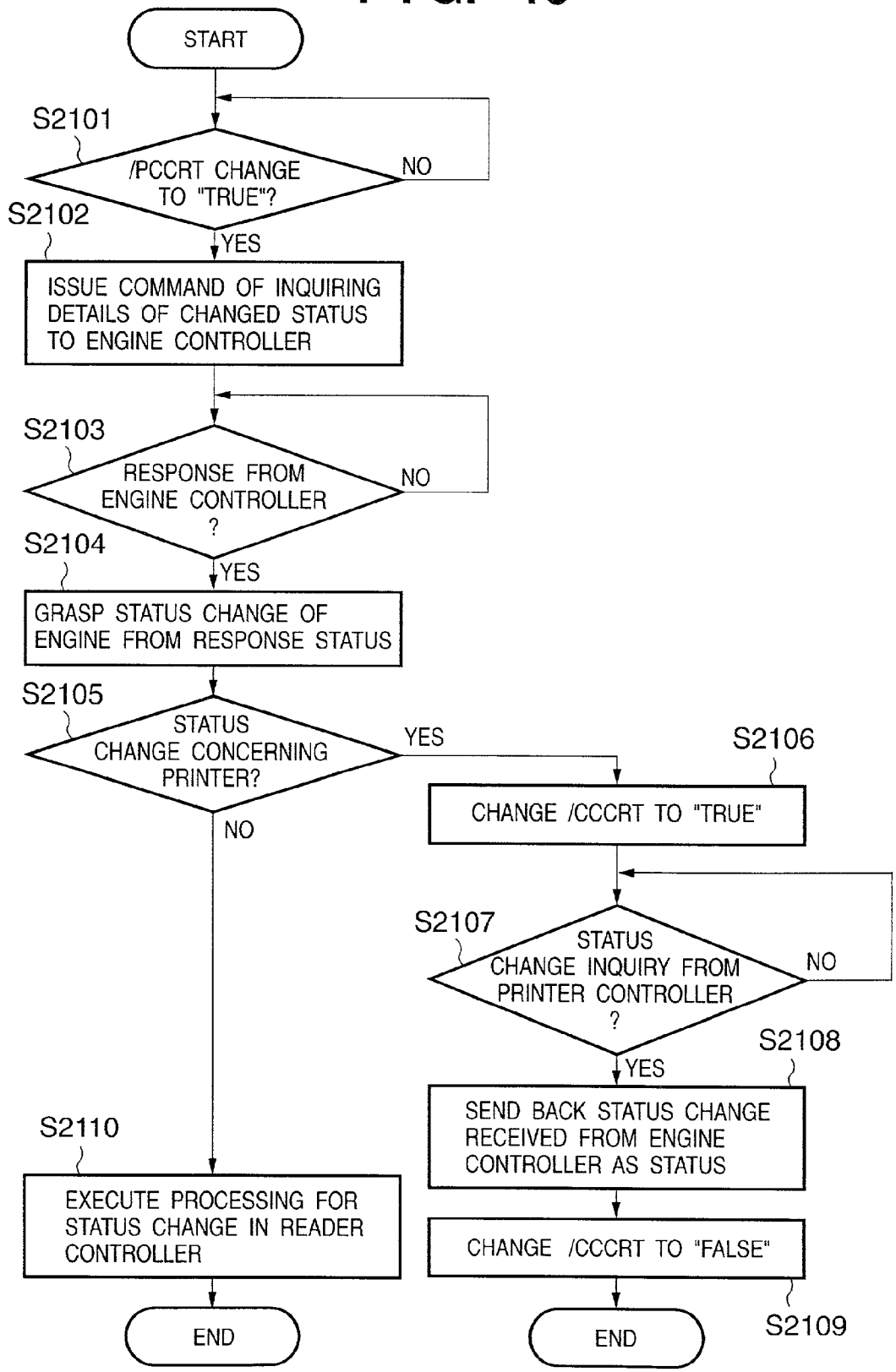
FIG. 19 is a flow chart showing the operation of the reader controller when a status change is transmitted to both the reader controller and printer controller.

FIG. 19 is a flow chart showing the operation of the reader controller when a status change is transmitted to both the reader controller and printer controller. If the /PCCRT signal becomes true in S2101, the reader controller issues a command of acquiring the status change to the engine controller (S2102). The reader controller waits for a response from the engine controller (S2103), and grasps the contents of the status change of the engine from the received status (S2104). The reader controller determines whether to notify the printer controller of the contents (S2105). For example, the reader controller notifies the printer controller of a change in sheet cassette size.

If the reader controller determines to notify the printer controller of the contents, the reader controller sets a flag by using the control circuit 2208, generates a status change signal /CCCRT, and notifies the printer controller of the contents (S2106). If the reader controller receives an inquiry about the status change signal (YES in S2107), it transmits to the printer controller the status change received from the engine controller as a status (S2108). After transmitting the status, the reader controller changes the status change signal /CCCRT to false.

If the response from the engine controller represents a status change of which the printer controller need not be notified, the reader controller executes necessary processing (S2110) and does not notify the printer controller of this.

In the print mode in which the printer controller controls the engine controller, the gate of the control circuit 2208 is open, as described above. Thus, the status change signal /PCCRT sent from the engine controller is directly received as the status change signal /CCCRT by the printer controller.

[Control to Execution Command]

Control of an execution command will be explained. Control of the reader controller when the printer controller and reader controller simultaneously issue use requests to the engine controller will be exemplified.

Figure 20:
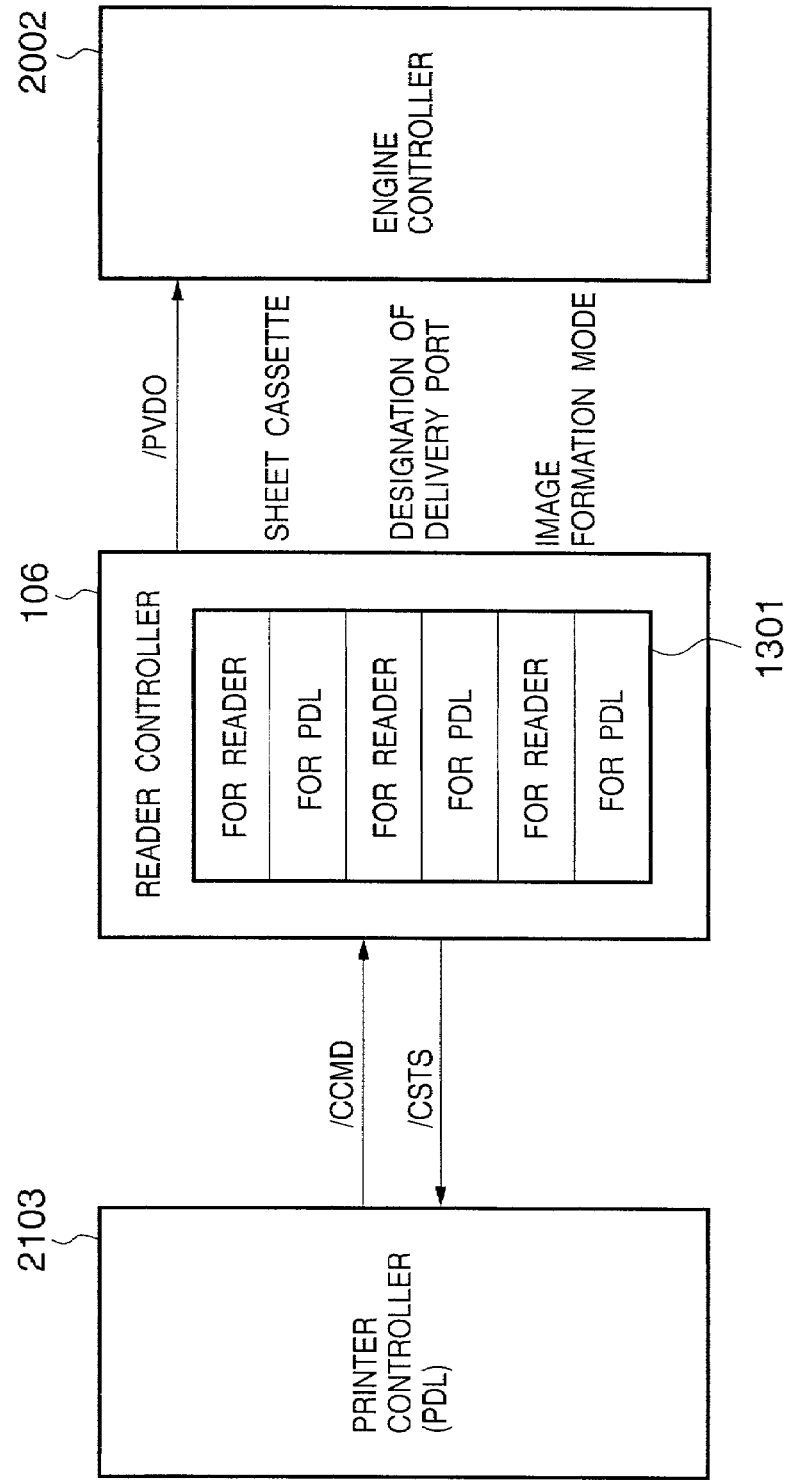
FIG. 20 is a block diagram showing the location and exchange of data when a print request is generated during copying operation.

FIG. 20 is a block diagram showing the location and exchange of data when a print request is generated during copying operation. At this time, the engine controller receives an image signal /PVDO sent from the reader controller and forms an image. This operation is done after settings such as designation of a sheet cassette, designation of a delivery port, and setting of an image formation mode, as shown in FIG. 8, have already been completed between the reader controller and the engine controller by serial communication. Reference numeral 1301 denotes a buffer for various set values that is incorporated in the reader controller 106, e.g., in the CPU. The buffer 1301 stores, at different locations, a value set by the reader controller to the engine controller and a value set by the printer controller to the engine controller.

If the printer controller issues a print request during copying operation, it is difficult in terms of the usability to execute print processing by interrupting copying operation. The print request in this situation suspends until copying operation ends.

Figure 21:
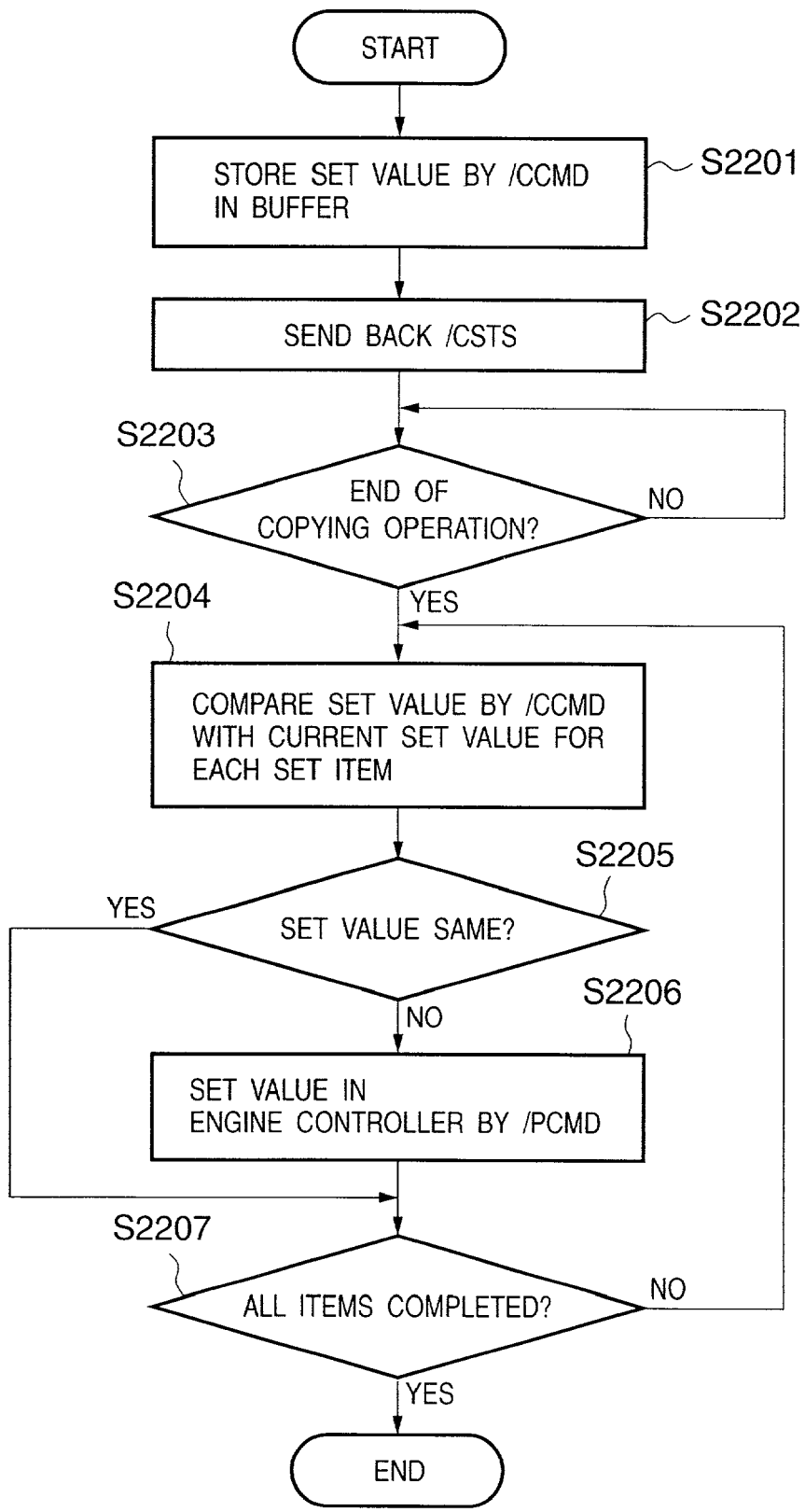
FIG. 21 is a flow chart for explaining command processing when a print request is generated during copying operation.

However, a status /CSTS with respect to a command /CCMD from the printer controller must be sent back within a predetermined time. For this reason, only a set value requested by /CCMD is stored in a printer controller (PDL) area of the buffer 1301. When a set value for the reader is different from a set value for PDL, the reader controller sets the value in the engine controller before print operation starts after copying operation ends. This will be explained in detail with reference to FIG. 21.

Assume that the printer is in copying operation, a sheet is set to be fed from the upper cassette and delivered to a faceup delivery port, and the image formation mode is set to a color mode for a color original. When the printer controller issues a print request, execution of print operation itself suspends, but various settings can be done. Assume that set values upon issuing the print request represent that a sheet is fed from an upper cassette and delivered to a facedown delivery port and a monochrome image is output. In this case, the reader controller stores the set values by a command from the printer controller in a predetermined area of the buffer 1301 (S2201) and sends back a status /CSTS (S2202). After copying operation ends (YES in S2203), the reader controller compares a value set in copying operation with the set value requested by the printer controller for each set item in the buffer (S2204 and S2205). If the set values are the same, they are not changed; if the set values are different, the reader controller issues a command /PCMD and updates the set value before the start of print operation (S2206).

In this example, as for the sheet cassette, both the reader controller and printer controller designate the upper cassette. The reader controller need not issue any sheet cassette designation command when copying operation ends and is switched to print operation. As for the delivery port and image formation mode, different ports and modes are designated between copying operation and print operation. When copying operation ends, the reader controller issues a delivery port designation command and image formation mode designation command to the engine controller. This operation is repeated for all the setting items (S2204 to S2207), and then processing ends.

The reader controller determines a command from the printer controller so as not only to suspend execution of a command to the engine controller but also to prevent repetitive setting of values which have already been set by the reader controller to the engine controller.

A case wherein a copying request is issued during print operation will be described with reference to FIG. 22. In this case, it is more preferable in terms of the usability in contrast to the case of FIG. 20 that copying operation interrupt print operation and be executed, than that a copying button is pressed in front of the copying machine but copying operation cannot be done owing to the progress of print operation.

Figure 22:
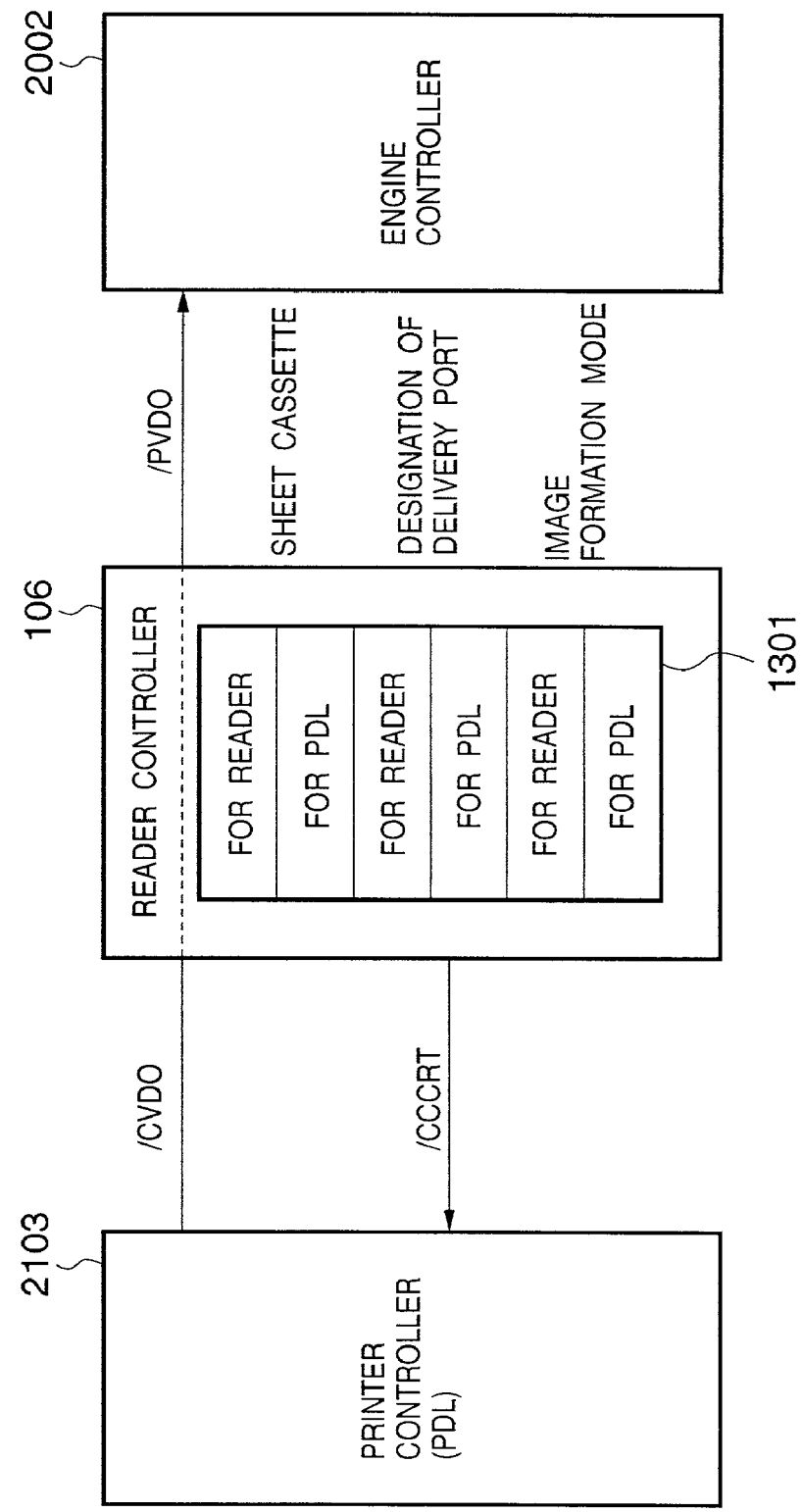
FIG. 22 is a block diagram showing processing for a copying request during print operation.

In the print mode, as shown in FIG. 22, image data /CVDO sent from the printer controller 2103 is selected by the selector 2201 and transmitted as /PVDO to the engine controller 2002. Assume that settings from the printer controller are the upper cassette, facedown delivery port, and monochrome image mode. The engine controller can detect the end only when a /PPRN signal from the printer controller changes to high (false), and does not know the number of prints to be obtained. Assume that the printer is to print out four images. If the reader does not issue a copying operation request by an interrupt, the engine controller generates four /PTOP signals at image timings as shown in FIG. 6, and images are sent from the printer controller to the engine controller via the reader controller 106 in accordance with the signals.

Figure 23:
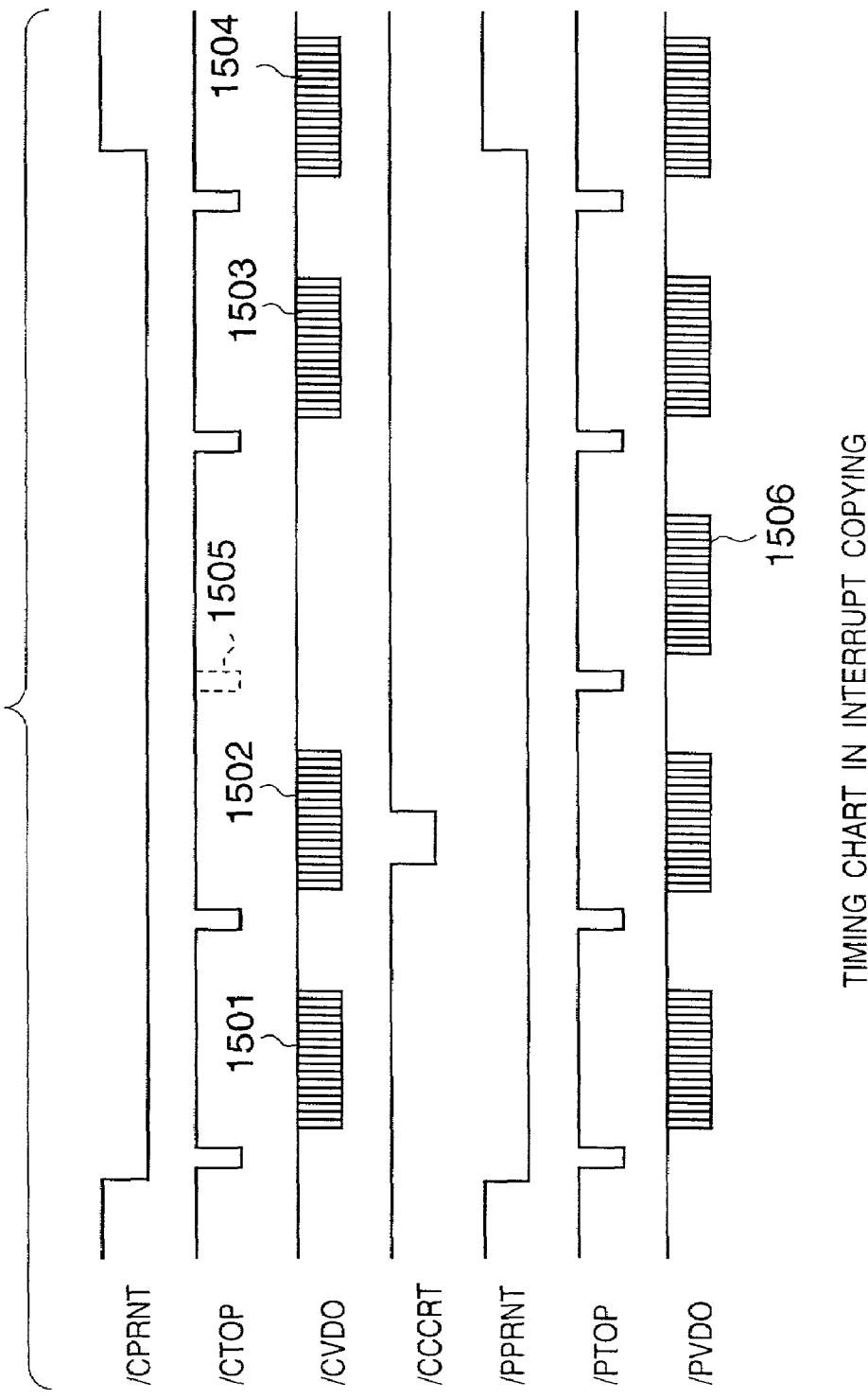
FIG. 23 is a timing chart for explaining processing timings when an interrupt copying request is generated during print-out operation.

A processing timing when an interrupt copying request for one copy of a color original is generated in the reader controller while the second image is printed out will be explained with reference to FIG. 23. The reader controller issues a /PPRNT request to the engine controller upon reception of a /CPRNT request from the printer controller, and the engine controller supplies a /PTOP signal as a /CTOP signal to the printer controller via the reader controller. Then, print operation of first and second images 1501 and 1502 is executed.

A case wherein the reader controller issues an interrupt copying request while the second image is printed out will be described. The reader controller generates a /CCCRT signal to the printer controller. This signal does not represent an actual change in engine status but requests the printer controller to free the engine in order to allow the reader to control the printer engine. The signal is generated by using the control circuit 2208, as described above. The printer controller issues a command of checking the engine status with respect to the /CCCRT signal, and the reader controller sends back a "copying-in-progress" status to the printer controller with respect to the checking command.

In general, the printer controller generates a time-out error a predetermined time after no /CTOP is supplied while /CPRNT is kept low (true). However, the printer controller is set to cancel the time-out error and permanently wait for the /CTOP signal when the printer controller receives the "copying-in-progress" status. Hence, the printer controller detects that the engine is in copying operation, and waits for the /CTOP signal while keeping the /CPRNT signal to low (true).

Since the image formation mode changes to the copying mode, the reader controller switches the selector and gate so as not to transmit the /PTOP signal from the engine controller to the printer controller (1505). The reader controller transmits the data received from the reader as image data /PVDO to the engine controller (1506). After an interrupt copy is obtained (FIG. 23 shows one interrupt copy), the image formation mode changes to the print mode again. The reader controller cancels masking of the /PTOP signal and sends it as /CTOP to the printer controller. The printer controller resumes operation and transmits third and fourth image data 1503 and 1504 to the engine controller where the image data 1503 and 1504 can be printed out. Interrupt copying operation during print operation can be achieved in this fashion.

The reader controller determines and controls either of the printer controller and reader controller which is to control the printer engine, and the timing of issuing a command in accordance with the situation. This realizes requests from two controllers for one engine.

[Control to Set Content Confirmation Command]

Control when the printer controller issues a set content confirmation command will be explained.

When the printer controller is to confirm a status set in the engine controller, the printer controller issues a set content confirmation command via /CCMD. The reader controller which has received this command checks an area of the set value storage buffer 1301 (FIG. 20), which corresponds to the current mode. If the set value requested by the printer controller is found, the reader controller reads out the contents and notifies the printer controller of the contents via /CSTS. If the printer controller requests a set value which is not in the buffer, the reader controller issues a set content confirmation command to the engine controller via /PCMD. The engine controller reads out the contents and notifies the reader controller of the set contents via /PSTS. The reader controller notifies the printer controller of the contents via /CSTS.

[Density Correction Method]

A density adjustment method as a feature of the present invention will be described.

The density is adjusted to reduce variations in print density in the printer and obtain an output of a desired print density.

[Density Correction Processing in Copying]

Density correction processing when the above-described image forming apparatus is used as a copying machine will be explained.

Figure 24:
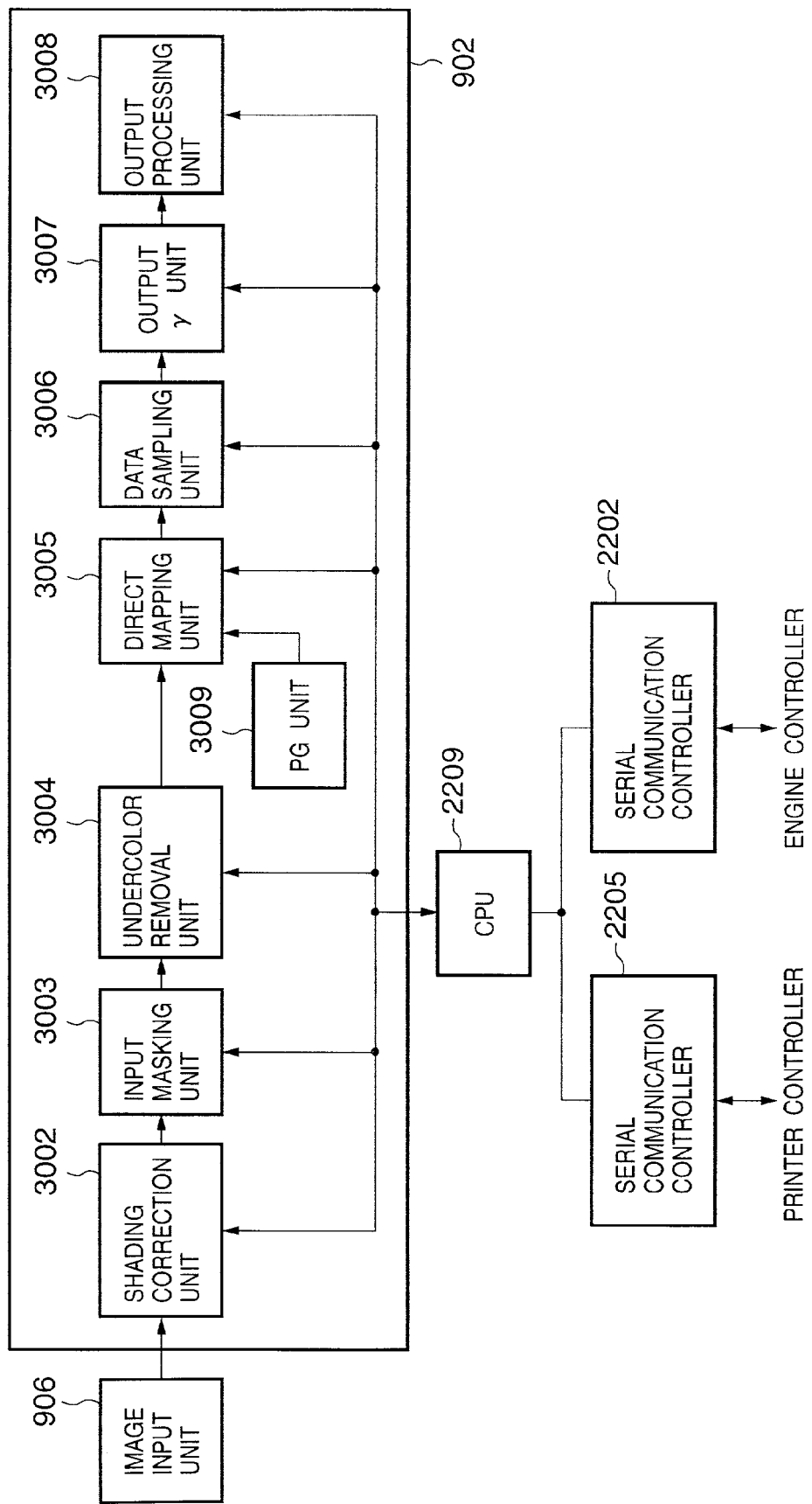
FIG. 24 is a block diagram showing an internal arrangement of an image signal processor in the reader controller and a connection to peripheral circuits.

FIG. 24 is a block diagram showing the internal arrangement of the image signal processing unit 902 in the reader controller 106 and the peripheral circuits.

In FIG. 24, the image input unit 906 transfers an image signal converted by the photoelectric converter 804 (104) such as a CCD sensor to the image signal processor. The image signal processing unit 902 comprises a shading correction unit 3002 for correcting the profile of the image input unit 906, an input masking unit 3003 for correcting the characteristics of the image input unit 906, an undercolor removal unit 3004 for replacing cyan, magenta and yellow with black (K), a direct mapping unit 3005 for performing correction suitable for the characteristics of an output unit (printer), a data sampling unit 3006, an output γ unit 3007, an output processing unit 3008 for performing binarization processing or the like, and a PG (Pattern Generator) unit 3009.

The density is corrected by the following procedures.

Image data representing a density pattern made up of a plurality of patches (small-area portions) with different densities is generated by the PG unit 3009 and output on a printing sheet by the printer.

Figure 27:
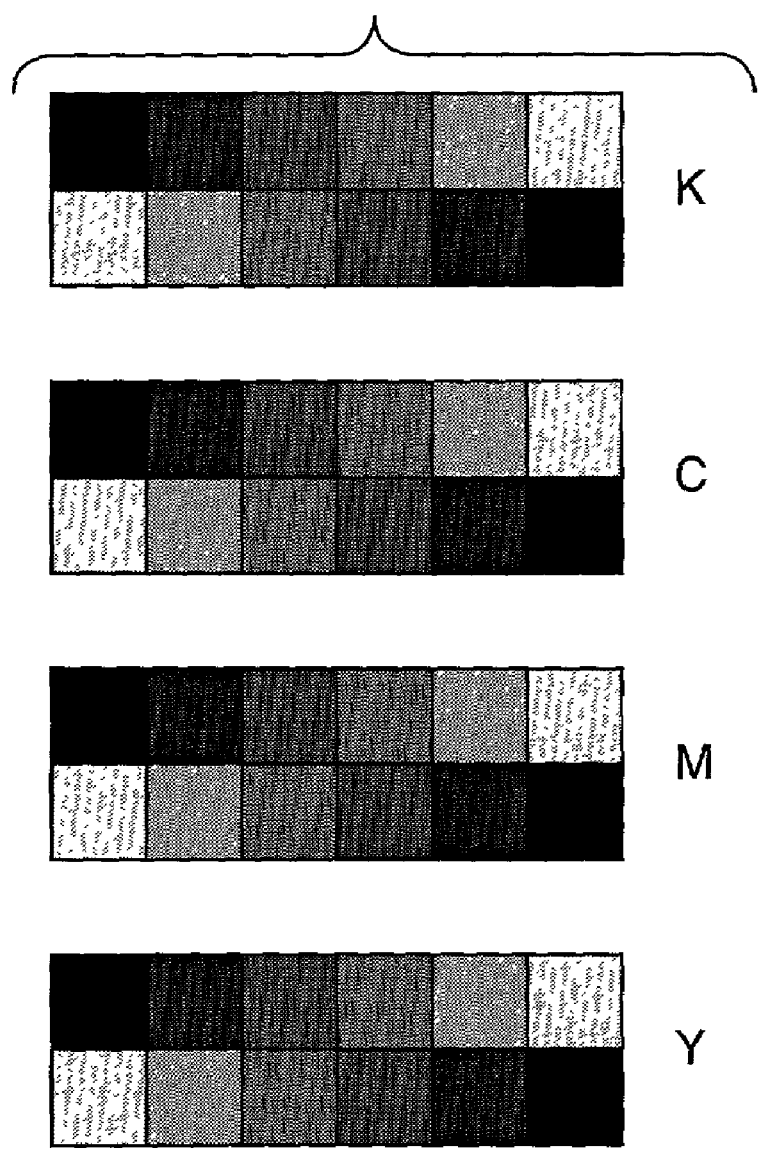
FIG. 27 is a view showing an example of a density pattern generated by a PG unit.

FIG. 27 is a view showing an output example of the pattern generated by the PG unit 3009. As shown in FIG. 27, density patterns are output for K, C, M, and Y colors when density correction is done for a printer capable of a color output.

This pattern output is placed on the original glass table 805 or original feeder 801 of the reader, and the pattern image is read. The read pattern data is supplied to the image signal processing unit 902 shown in FIG. 24 via the image input unit 906, and sampled by the data sampling unit 3006. The sampling result is processed by the CPU 2209 shown in FIG. 24.

The processing contents of the CPU 2209 will be explained with reference to FIG. 26. The CPU 2209 calculates the difference between digital data of the pattern formation density and an actual output density (or a value of image data obtained by reading it), and adjusts (corrects) the density so as to eliminate the difference.

For example, a pattern generated by the PG unit 3009 has eight density levels with intervals of 32 from a density of 0 (in FIG. 27, a pattern is made up of seven types of density patches including a density of 0 (no data is printed)). A predetermined number of pixel data are sampled from each density patch on the basis of the difference from the read image data input to the data sampling unit 3006. The CPU 2209 calculates the sample average value for each density patch.

Figure 26:
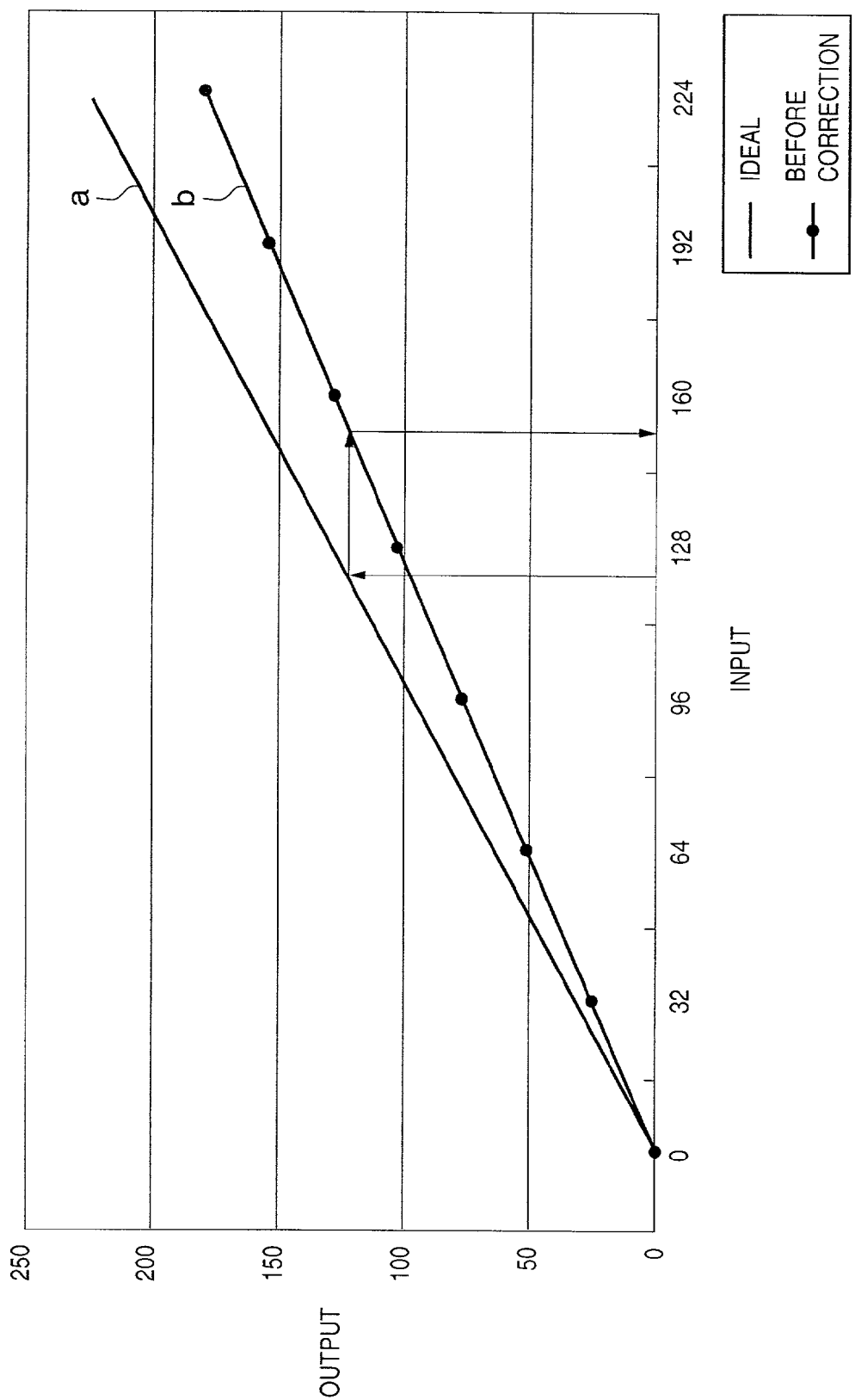
FIG. 26 is a graph for explaining a density correction principle.

The sample average value (output value) for each density patch is plotted in correspondence with the value in input (input value), as represented by · in FIG. 26. An ideal input/output characteristic is determined in advance, and the density is corrected to eliminate the difference between the measured value and the ideal characteristic.

For example, a straight line b represents an input/output characteristic attained by connecting measured values, and a straight line a represents an ideal input/output characteristic determined in advance. In this case, an actual output density decreases in comparison with an ideal output density with respect to input digital data. To obtain an ideal density, a correction value is obtained for an input digital data value so as to eliminate the difference from the ideal characteristic, and a correction table is created. The created correction table is reflected on the output γ unit 3007. The output γ unit 3007 adds a corresponding correction value in the correction table in accordance with an input value, and outputs the sum. This correction processing attains an ideal output density.

[Density Correction Processing of PDL Data]

Figure 25:
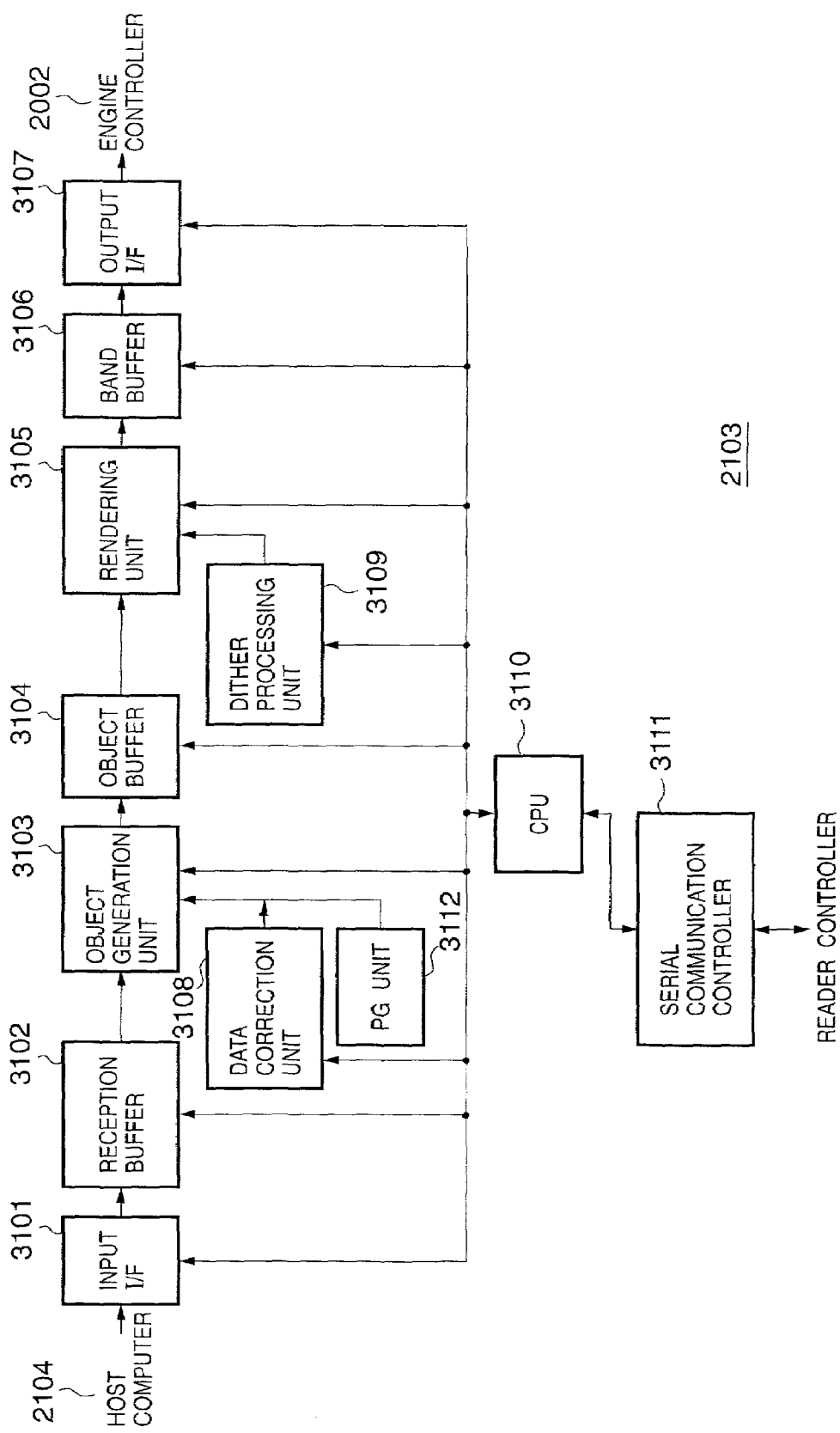
FIG. 25 is a block diagram showing an arrangement concerning density correction processing in the printer controller.

Density correction processing when the above-mentioned image forming apparatus is used as a printer will be described. FIG. 25 is a block diagram showing an arrangement concerning density correction processing in the printer controller 2103.

In FIG. 25, reference numeral 3101 denotes an input I/F to an external device such as the host computer 2104; 3102, a reception buffer; 3103, an object generation unit for mapping data to a bitmap; 3104, an object buffer; 3105, a rendering unit for performing color processing; 3106, a band buffer (output buffer); 3107, an output I/F to the engine controller 2002; 3108, a data correction unit; 3109, a dither processing unit; 3110, a CPU; 3111, a communication controller; and 3112, a PG (Pattern Generator) unit.

Detailed correction processing will be explained.

Up to creation of a correction table, density correction processing is basically the same as in the case wherein the image forming apparatus is used as a copying machine.

More specifically, image data representing a pattern made up of a plurality of patches with different densities is generated by the PG unit 3112 in the printer controller 2103, and output by the printer via the engine controller 2002.

The pattern output is placed on the original glass table 805 or original feeder 801 of the reader, and the pattern image is read. The subsequent processing is the same as density correction processing for a copied image, and a correction table is created. At this time, the ideal input/output characteristic is the same as in copying. The created correction table is transmitted from the reader controller 106 to the printer controller 2103 by using a communication means. That is, the serial communication controller 2205 in the reader controller 106 is connected to the serial communication controller 3111 in the printer controller 2103. The contents of the correction table are transmitted to the printer controller 2103 by using the two controllers.

The CPU 3110 in the printer controller 2103 sets the correction characteristic of the data correction unit 3108 on the basis of the transmitted correction table. Accordingly, image data from the printer controller 2103 can also undergo the same density correction as image data read from the reader.

Communication contents transmitted from the reader controller 106 to the printer controller 2103 may be a correction table itself used by the data correction unit 3108 of the printer controller 2103. For example, correction table data of 256 levels for each of three colors (C, M, and Y) or four colors (C, M, Y, and K) are communicated.

The correction table can be generated in the printer controller 2103. For example, when the ideal input/output characteristic is different from that in copying, a correction table for eliminating the difference between the ideal input/output characteristic and an input/output characteristic held in the printer controller 2103 can be generated. To generate a correction table in the printer controller 2103, pattern image data read by the reader is directly transmitted from the reader controller 106 to the printer controller 2103. In this case, it is also possible depending on the read resolution to sample a predetermined number of image data by the data sampling unit 3006 for each of density patches for three or four colors and to transmit the sampled data.

Alternatively, only the difference between read pattern image data and an ideal output value may be transmitted. By exchanging information necessary for density correction by using the serial communication controllers, density correction can be easily performed for printing data received by the printer controller without adopting any special signal line between the reader controller and the printer controller.

[Other Embodiment]

In the above embodiment, data from an original, host computer, or the like is color data, and a color original reading apparatus is used. The above-described density adjustment processing can also be applied for monochrome data.

The present invention may be applied to a system constituted by a plurality of devices (e.g., a host computer, interface device, reader, and printer) or an apparatus comprising a single device (e.g., a copying machine or facsimile apparatus). For example, density adjustment processing of the present invention can be implemented even in a system in which a reader such as an image scanner is connected to a printer via a network or cable.

The object of the present invention is realized even by supplying a storage medium which stores software program codes for realizing the functions of the above-described embodiment to a system or apparatus, and causing the computer (or a CPU or MPU) of the system or apparatus to read out and execute the program codes stored in the storage medium.

In this case, the program codes read out from the storage medium realize the functions of the above-described embodiment, and the storage medium which stores the program codes constitutes the present invention.

As a storage medium for supplying the program codes, a floppy disk, hard disk, optical disk, magnetooptical disk, CD-ROM, CD-R, magnetic tape, nonvolatile memory card, ROM, or the like can be used.

The functions of the above-described embodiment are realized not only when the computer executes the readout program codes, but also when the OS (Operating System) running on the computer performs part or all of actual processing on the basis of the instructions of the program codes.

The functions of the above-described embodiment are also realized when the program codes read out from the storage medium are written in the memory of a function expansion board inserted into the computer or that of a function expansion unit connected to the computer, and the CPU of the function expansion board or function expansion unit performs part or all of actual processing on the basis of the instructions of the program codes.

When the present invention is applied to the storage medium, the storage medium stores program codes corresponding to at least one of the above-described flow charts.

As has been described above, the present invention can implement an image forming apparatus having an image reading function in which the density of even an image formed based on data acquired from an apparatus other than an image reading apparatus can be corrected by arranging a pattern generator for generating a predetermined pattern in a printer controller for receiving external printing data and by correcting the printing data on the basis of only the results of reading a pattern output, and a control method therefor.

Furthermore, the present invention can be applied to the system comprising either a plurality of units or a single unit. It is needless to say that the present invention can be applied to the case which can be attained by supplying programs which execute the process defined by the present system or invention.

As many apparently widely different embodiments of the present invention can be made without departing from the spirit and scope thereof, it is to be understood that the invention is not limited to the specific embodiments thereof except as defined in the appended claims.

What is claimed is:

1. An image processing apparatus comprising:
   image reading means for reading original image data;
   first generating means for generating image data of a first patch image read by said image reading means and sending to a print controller, wherein the print controller generates a first correction data based on the generated image data and a first ideal input/output characteristic of the print controller; and
   second generating means for generating a second correction data based on image data of a second patch image read by said image reading means and a second ideal input/output characteristic for a copying operation, wherein the second ideal input/output characteristic is different from the first ideal input/output characteristic, wherein image data read by said image reading means is corrected by a controller for the copying operation based on the second correction data, and image data received from an external device is corrected by the print controller based on the first correction data.

2. An image processing apparatus according to claim 1, wherein the print controller and the controller for the copying operation reside on a same chassis.

3. The image processing apparatus according to claim 1, wherein the image data of the first and the second patch images read by said image reading means to generate the first and the second correction data are respectively generated by different generating means.

4. The image processing apparatus according to claim 1, wherein the image data of the first and the second patch images read by said image reading means to generate the first and the second correction data are both made up of a plurality of patches with different densities.

5. The image processing apparatus according to claim 1, wherein the image data of the first and the second patch images read by said image reading means first corrected by performing a direct mapping suitable for the characteristics of the print controller and then corrected by applying the first correction data.

6. An image processing method comprising the steps of:
reading original image data read by an image reading means;
generating image data of a first patch image read by said image reading means and sending to a print controller, wherein the print controller generates a first correction data based on the generated image data and a first ideal input/output characteristic of the print controller; and
generating a second correction data based on image data of a second patch image read by said-image reading means and a second ideal input/output characteristic for a copying operation, wherein the second ideal input/output characteristic is different from the first ideal input/output characteristic,
wherein image data read in said image reading step is corrected by a controller for the copying operation based on the second correction data, and image data received from an external device is corrected by the print controller based on the first correction data.

7. An image processing apparatus comprising:
image reading means for reading original image data;
first generating means for generating a first correction data for printing based on image data of a first patch image read by said image reading means and a first ideal input/output characteristic of a printer;
second generating means for generating a second correction data for a copying operation based on image data of a second patch image read by said image reading means and a second ideal input/output characteristic for copying, which is different from the first ideal input/output characteristic,
wherein when the copying operation is performed, image data for the copying operation is corrected based on the second correction data, and image data, written in a description language and received from an external device other than the image reading means, is corrected based on the first correction data.

8. The image processing apparatus according to claim 7, wherein said first patch image is made up of a plurality of patches with different densities.

9. The image processing apparatus according to claim 7, wherein said second patch image is made up of a plurality of patches with different densities.

* * * * *

UNITED STATES PATENT AND TRADEMARK OFFICE
CERTIFICATE OF CORRECTION

PATENT NO. : 7,075,664 B2  Page 1 of 1
APPLICATION NO. : 09/796547
DATED : July 11, 2006
INVENTOR(S) : Koji Arai It is certified that error appears in the above-identified patent and that said Letters Patent is hereby corrected as shown below:

TITLE PAGE:
Item (54) Title, "THEREFOR" should read -- THEREFOR CAPABLE OF DENSITY ADJUSTMENT --.

COLUMN 1:
Line 2, "THEREFOR" should read -- THEREFOR CAPABLE OF DENSITY ADJUSTMENT --.

COLUMN 8:
Line 4, "deliver)" should read -- delivery) --.

COLUMN 21:
Line 10, "means" should read -- means are --; and
Line 23, "said-image" should read -- said image --.

Signed and Sealed this

Twelfth Day of June, 2007

JON W. DUDAS
*Director of the United States Patent and Trademark Office*